US012621880B2

(12) United States Patent
Zhu et al.

(10) Patent No.: US 12,621,880 B2
(45) Date of Patent: May 5, 2026

(54) IDENTIFIER MANAGEMENT METHOD AND APPARATUS

(71) Applicant: HUAWEI TECHNOLOGIES CO., LTD., Shenzhen (CN)

(72) Inventors: Yuanping Zhu, Shanghai (CN); Mingzeng Dai, Shenzhen (CN); Yibin Zhuo, Shenzhen (CN); Jing Liu, Shanghai (CN)

(73) Assignee: Huawei Technologies Co., LTD., Shenzhen (CN)

( * ) Notice: Subject to any disclaimer, the term of this patent is extended or adjusted under 35 U.S.C. 154(b) by 113 days.

(21) Appl. No.: 17/401,926

(22) Filed: Aug. 13, 2021

(65) Prior Publication Data

US 2021/0378035 A1      Dec. 2, 2021

Related U.S. Application Data

(63) Continuation of application No. PCT/CN2019/079366, filed on Mar. 22, 2019.

(30) Foreign Application Priority Data

Feb. 15, 2019    (CN) .......................... 201910117983.X

(51) Int. Cl.
H04W 76/00          (2018.01)
H04W 36/00          (2009.01)
(Continued)

(52) U.S. Cl.
CPC ........ H04W 76/11 (2018.02); H04W 36/0019 (2023.05); H04W 36/0064 (2023.05); H04W 76/12 (2018.02)

(58) Field of Classification Search
CPC . H04W 76/11; H04W 76/12; H04W 36/0055; H04W 40/22; H04W 84/047;
(Continued)

(56) References Cited

U.S. PATENT DOCUMENTS

2019/0289492 A1* 9/2019 Hampel ................ H04W 76/12
2020/0413457 A1* 12/2020 Hong .................... H04W 76/10
(Continued)

FOREIGN PATENT DOCUMENTS

CN          103428789 A      12/2013
CN          103813298 A       5/2014
(Continued)

OTHER PUBLICATIONS

3GPP et al. (3GPP TR 38.874 V16.0.0), Dec. 2018.*
(Continued)

*Primary Examiner* — Lakeram Jangbahadur
(74) *Attorney, Agent, or Firm* — Fish & Richardson P.C.

(57)          ABSTRACT

Examples in this application provide an identifier management method and apparatus. One example method includes receiving, by a first donor node, first indication information sent by a first node, where the first indication information indicates that the first node can be configured to provide a wireless backhaul service, and sending, by the first donor node to the first node, a first identifier, where the first identifier uniquely identifies the first node on a wireless backhaul link within a service range of the first donor node.

12 Claims, 11 Drawing Sheets

(51) Int. Cl.
  *H04W 76/11* (2018.01)
  *H04W 76/12* (2018.01)

(58) Field of Classification Search
  CPC ............ H04W 88/085; H04W 36/0011; H04L
  5/0053; H04L 41/0803
  See application file for complete search history.

(56) References Cited

U.S. PATENT DOCUMENTS

2021/0219183 A1* 7/2021 Huang .............. H04W 28/0278
2021/0409328 A1* 12/2021 Xu .......................... H04L 45/74

FOREIGN PATENT DOCUMENTS

| CN | 104144438 A | 11/2014 |
| CN | 106302620 A | 1/2017 |
| CN | 109219102 A | 1/2019 |
| WO | 2019032230 A1 | 2/2019 |

OTHER PUBLICATIONS

Huawei (Huawei et al: "Adaptation layer design", 3GPP Draft; R2-1815545, Sep. 2018).*

Samsung ( IP address management over IAB network), R3-191552, Apr. 8, 2019.*

3GPP TS 38.331 V15.4.0 (Dec. 2018), "3rd Generation Partnership Project; Technical Specification Group Radio Access Network;NR-;Radio Resource Control (RRC) protocol specification(Release 15)," Dec. 2018, 474 pages.

3GPP TS 38.401 V15.4.0 (Dec. 2018), "3rd Generation Partnership Project; Technical Specification Group Radio Access Network;NG-RAN;Architecture description(Release 15)," Dec. 2018, 40 pages.

3GPP TS 38.473 V15.4.1 (Jan. 2019), "3rd Generation Partnership Project; Technical Specification Group Radio Access Network; NG-RAN;F1 application protocol (F1AP)(Release 15)," Jan. 2019, 192 pages.

Huawei, "CP protocol design for L2 relaying," 3GPP TSG-RAN WG3 #100, R3-183183, Busan, Korea, May 21-25, 2018, 5 pages.

Huawei, HiSilicon, "Adaptation layer design," 3GPP TSG-RAN WG2 #103bis, R2-1815545, Chengdu, China, Oct. 8-12, 2018, 5 pages.

Huawei, Hisilicon, "IAB node access procedure," 3GPP TSG-RAN WG2 #102, R2-1808684, Busan, Korea, May 21-25, 2018, 5 pages.

KDDI Corporation, Kyocera, "Discussion on IAB architecture 1a," 3GPP TSG RAN WG2 #102, R2-1806736, Busan, Korea, May 21-25, 2018, 7 pages.

Office Action issued in Chinese Application No. 201910117983.X on Jan. 22, 2021, 12 pages (with English translation).

PCT International Search Report and Written Opinion issued in International Application No. PCT/CN2019/079366 on Nov. 5, 2019, 15 pages (with English translation).

ZTE, "Considerations on adaptation layer in IAB," 3GPP TSG-RAN WG3 Meeting #100, R3-182788, Busan, Korea, May 21-25, 2018, 5 pages.

3GPP TR 38.874 V16.0.0 (Dec. 2018), "3rd Generation Partnership Project; Technical Specification Group Radio Access Network; NR; Study on Integrated Access and Backhaul; (Release 16)," Dec. 2018, 111 pages.

Extended European Search Report issued in European Application No. 19914955.0 on Feb. 25, 2022, 10 pages.

Huawei et al., "Adaptation layer design," 3GPP TSG-RAN WG2 #103bis, R2-1815545, Chengdu, China, Oct. 8-12, 2018, 5 pages.

* cited by examiner

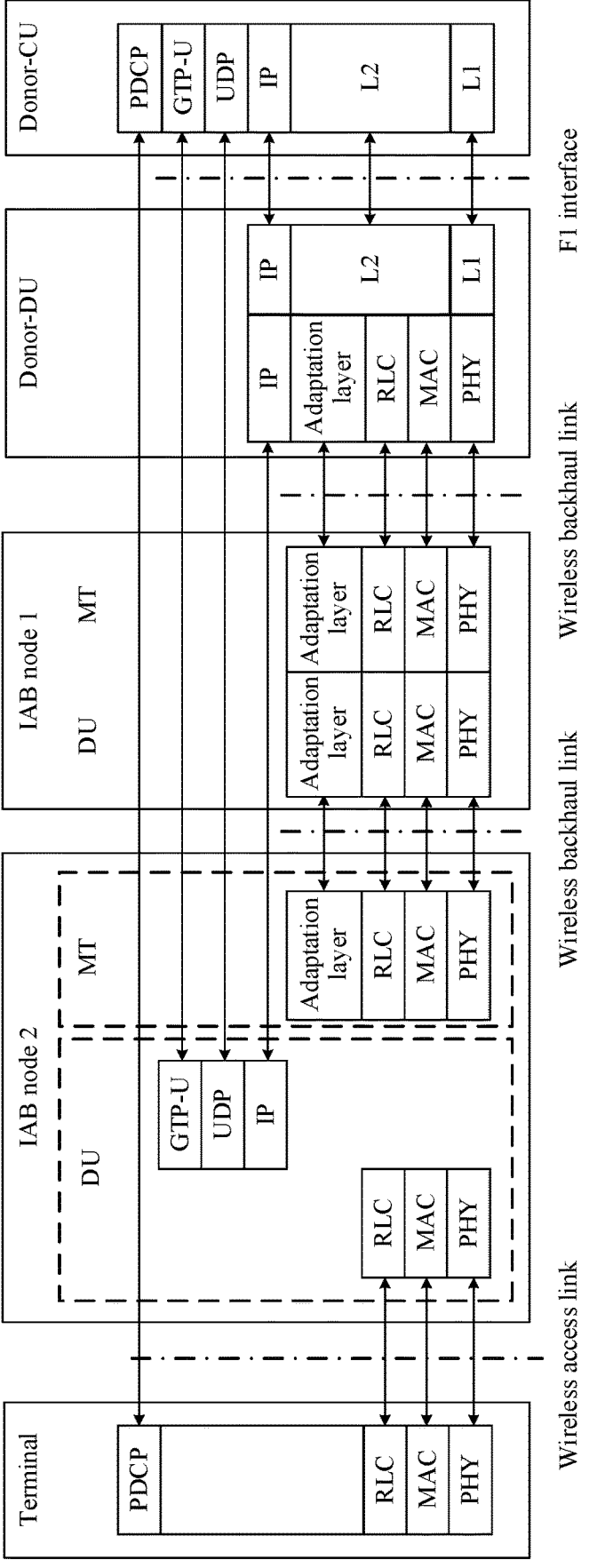
FIG. 4(a) User plane protocol stack of each node in a multi-hop IAB network

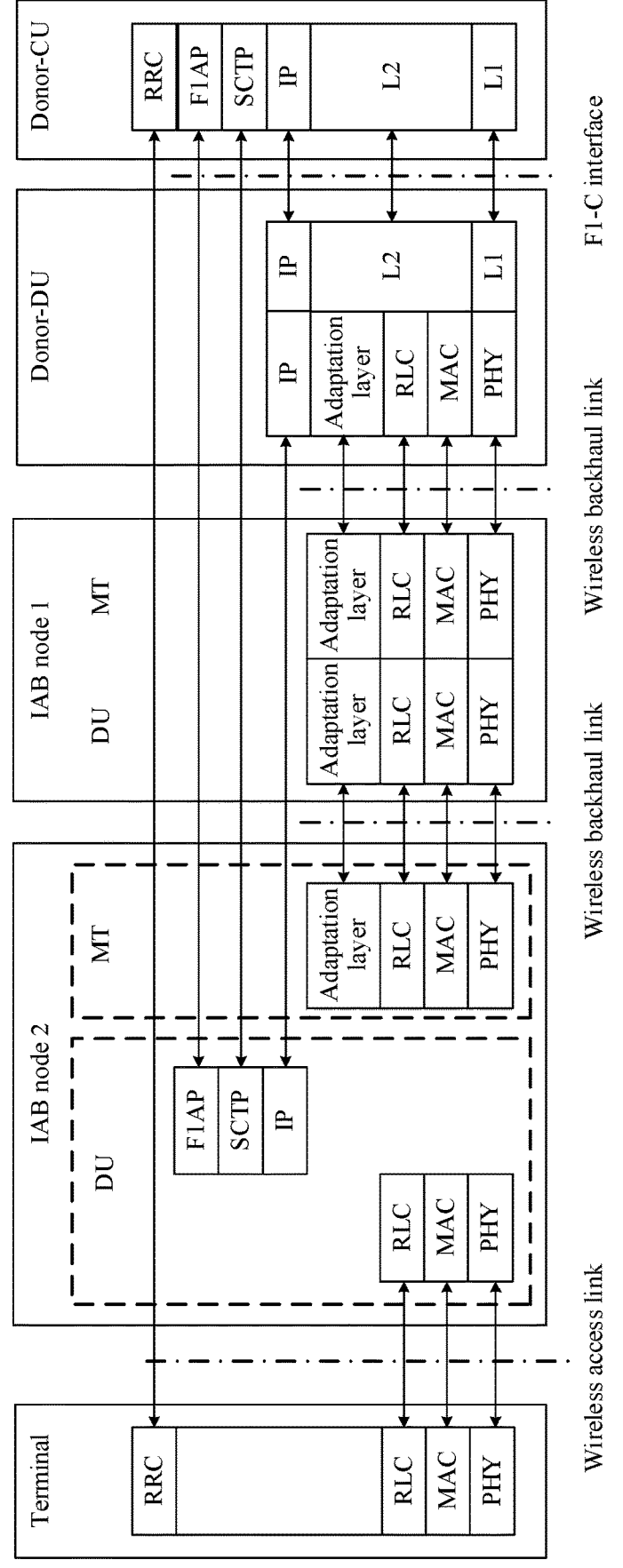
FIG. 4(b) Control plane protocol stack of each node in the multi-hop IAB network

| Prefix information of a donor node | Identification information of an IAB node #1 |
| --- | --- |

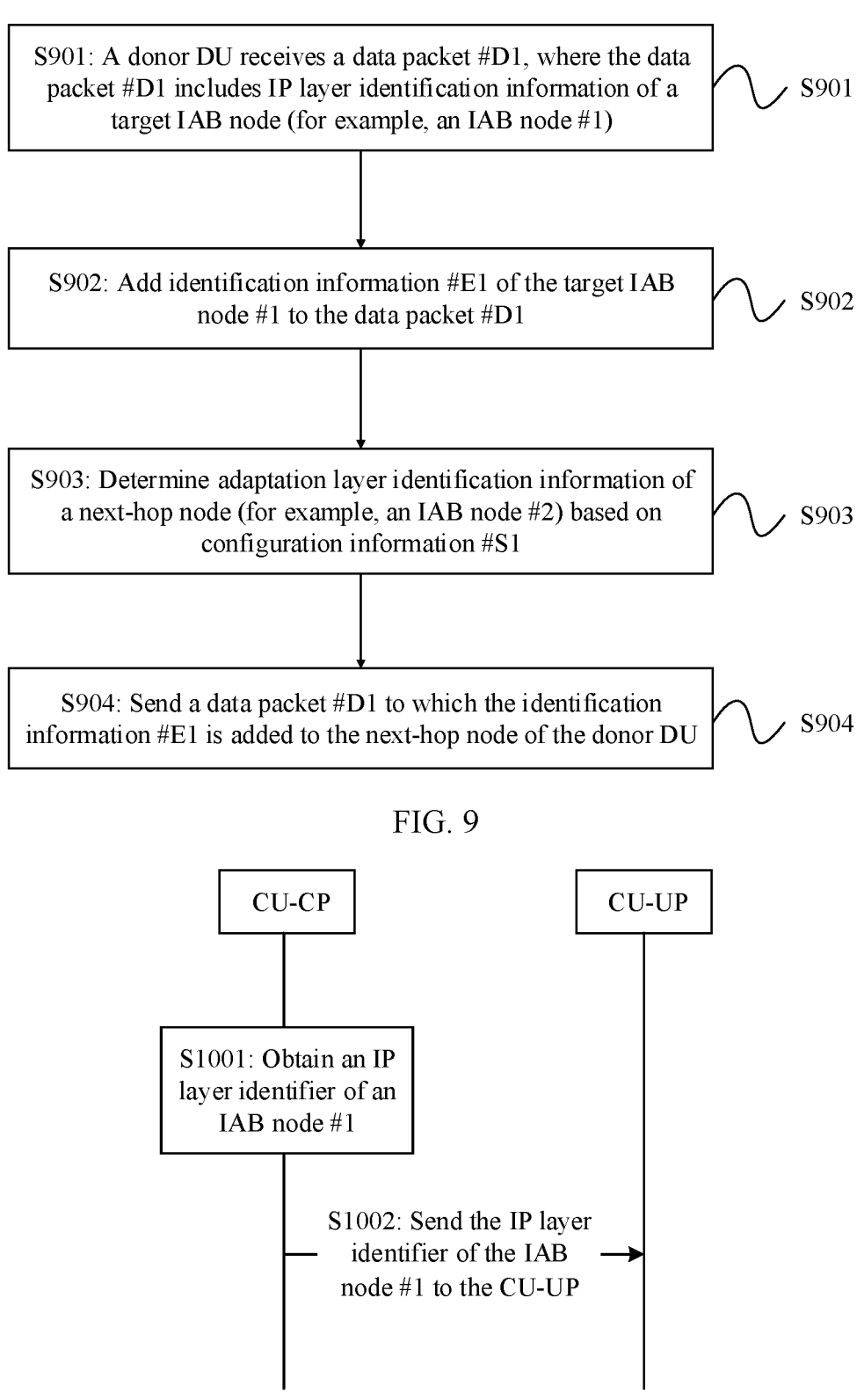

S901: A donor DU receives a data packet #D1, where the data packet #D1 includes IP layer identification information of a target IAB node (for example, an IAB node #1)  〜 S901

S902: Add identification information #E1 of the target IAB node #1 to the data packet #D1  〜 S902

S903: Determine adaptation layer identification information of a next-hop node (for example, an IAB node #2) based on configuration information #S1  〜 S903

S904: Send a data packet #D1 to which the identification information #E1 is added to the next-hop node of the donor DU  〜 S904

S1001: Obtain an IP layer identifier of an IAB node #1

S1002: Send the IP layer identifier of the IAB node #1 to the CU-UP

FIG. 10

IDENTIFIER MANAGEMENT METHOD AND APPARATUS

CROSS-REFERENCE TO RELATED APPLICATIONS

This application is a continuation of International Application No. PCT/CN2019/079366, filed on Mar. 22, 2019, which claims priority to Chinese Patent Application No. 201910117983.X, filed on Feb. 15, 2019. The disclosures of the aforementioned applications are hereby incorporated by reference in their entireties.

TECHNICAL FIELD

This application relates to the communications field, and more specifically, to an identifier management method and apparatus.

BACKGROUND

In a network including integrated access and backhaul (IAB) nodes, there are a plurality of transmission links on a transmission path between UE and an IAB donor (IAB Donor, which is also referred to as a donor node, or referred to as a donor gNB). The transmission links include at least one wireless backhaul link and one wireless access link. The access link is a communications link between the UE and an IAB node. The wireless backhaul link is a communications link between IAB nodes or between an IAB node and the donor node. A data packet needs to pass through a plurality of intermediate nodes when transmission of the data packet is performed between the UE and the IAB donor. Both the donor node and the IAB node need to perform route selection on the data packet, determine a next-hop node, and then forward the data packet. The route selection needs to be performed based on routing information carried in the data packet. For downlink transmission, an identifier of an IAB node may be used as routing information of a data packet in a transmission process on a wireless backhaul link. Although the IAB node may obtain a cell radio network temporary identifier (C-RNTI) from a parent node, the identification information is used to uniquely identify the IAB node only in a cell served by the parent node, and the identification information cannot be used to address the IAB node on a wireless backhaul link within a service range of the donor node. Therefore, how to use an effective method for managing an identifier of an IAB node becomes an urgent problem to be resolved.

SUMMARY

This application provides an identifier management method and apparatus, to reduce routing overheads in an air interface transmission process in an IAB network, thereby improving data transmission efficiency in the IAB network.

According to a first aspect, an identifier management method is provided, where the method includes: A first donor node receives first indication information sent by a first node, where the first indication information is used to indicate that the first node can be configured to provide a wireless backhaul service. The first donor node sends a first identifier to the first node, where the first identifier is used to uniquely identify the first node on a wireless backhaul link within a service range of the first donor node.

With reference to the first aspect, in some implementations of the first aspect, the first identifier includes an identifier of the first donor node and identification information specific to the first node.

Optionally, the first node may be an integrated access and backhaul (IAB) node or a relay node in an LTE system.

With reference to the first aspect, in some implementations of the first aspect, the method further includes: The first donor node sends the first identifier to a second node, where the second node is a parent node of the first node.

Optionally, the first identifier may be an adaptation layer identifier of the first node.

With reference to the first aspect, in some implementations of the first aspect, the first donor node includes a distributed unit DU and a centralized unit CU, and the method further includes: The distributed unit DU receives first configuration information sent by the centralized unit CU, where the first configuration information includes an identifier of the first node and an IP layer identifier of the first node.

Optionally, the first configuration information further includes an identifier of a third node. The third node is a child node of the first donor node.

In other words, a donor node donor CU may perform route configuration on a donor DU.

With reference to the first aspect, in some implementations of the first aspect, the first donor node includes a distributed unit DU and a centralized unit CU, and the centralized unit CU includes a control plane CU-CP and a user plane CU-UP. The method further includes: The CU-CP obtains an IP layer identifier of the first node, and the CU-CP sends the IP layer identifier of the first node to the CU-UP.

For example, the IP layer identifier of the first node may be an IPv4 address or an IPv6 address of the first node.

With reference to the first aspect, in some implementations of the first aspect, the method further includes: The first donor node sends first request information to a second donor node, where the first request information is used to request the first node to be handed over to the second donor node. The first donor node receives a second identifier sent by the second donor node. The first donor node sends the second identifier to the first node, where the second identifier is used to identify the first node in a route of a wireless backhaul link.

In this embodiment of this application, when a topology structure of an IAB network is updated or a CU connected to an IAB node changes, that is, an IAB node #1 is handed over, after the handover, the IAB node #1 is connected to a target CU. The target CU receives handover request information sent by a source CU, and allocates a new adaptation layer identifier to the IAB node #1. The target CU sends the adaptation layer identifier to the source CU, and the source CU sends the adaptation layer identifier to the IAB node #1, where the source CU is a donor node connected to the IAB node #1 before the IAB node #1 is handed over.

With reference to the first aspect, in some implementations of the first aspect, the first indication information is further used to indicate the first donor node to allocate a first identifier to the first node.

With reference to the first aspect, in some implementations of the first aspect, the distributed unit DU receives a first data packet sent by the centralized unit CU, where the first data packet includes the IP layer identifier of a first node and data. The DU sends a second data packet to the first node, where the second data packet includes the IP layer identifier of the first node, the first identifier, and the data.

According to a second aspect, an identifier management method is provided, where the method includes: A first node sends first indication information to a first donor node, where the first indication information is used to indicate that the first node can be configured to provide a wireless backhaul service. The first node receives a first identifier sent by the donor node, where the first identifier is used to uniquely identify the first node on a wireless backhaul link within a service range of the first donor node.

With reference to the second aspect, in some implementations of the second aspect, the first identifier includes an identifier of the first donor node and identification information specific to the first node.

With reference to the second aspect, in some implementations of the second aspect, the method further includes: The first node sends the first identifier to a second node, where the second node is a parent node of the first node.

With reference to the second aspect, in some implementations of the second aspect, when the first node is handed over from the first donor node to a second donor node, the method further includes: The first node receives a second identifier sent by the first donor node, where the second identifier is used to uniquely identify the first node on a wireless backhaul link within a service range of the second donor node.

According to a third aspect, an identifier management method is provided, where the method includes: A donor node obtains a third identifier allocated by a second node to a first node, where the third identifier is used to identify the first node in a cell served by the second node, and the first node is a child node of the second node. The donor node sends third configuration information to a third node, where the third configuration information includes the third identifier, identification information of the cell served by the second node, and an identifier of a next-hop node of the third node, and the third node is an intermediate node between the donor node and the first node.

With reference to the third aspect, in some implementations of the third aspect, the method further includes: The donor node obtains first interface identification information or second interface identification information, and determines the first node based on the first interface identification information and/or the second interface identification information.

The first interface identification information is identification information that is allocated by the second node to the first node and that is on an interface between the donor node and the second node. The second interface identification information is identification information that is allocated by the donor node to the first node and that is on the interface between the donor node and the second node.

With reference to the third aspect, in some implementations of the third aspect, the third configuration information is included in an F1AP message or an RRC message sent by the donor node to the third node.

With reference to the third aspect, in some implementations of the third aspect, the donor node includes a distributed unit DU and a centralized unit CU, and the method further includes: The DU receives fourth configuration information sent by the CU, where the fourth configuration information includes the third identifier, the identification information of the cell served by the second node, and an IP layer identifier of the first node.

According to a fourth aspect, an identifier management apparatus is provided, where the apparatus includes: a receiving unit, configured to receive first indication information sent by a first node, where the first indication information is used to indicate that the first node can be configured to provide a wireless backhaul service; and a sending unit, configured to send a first identifier to the first node, where the first identifier is used to uniquely identify the first node on a wireless backhaul link within a service range of the first donor node.

With reference to the fourth aspect, in some implementations of the fourth aspect, the first identifier includes an identifier of the first donor node and identification information specific to the first node.

With reference to the fourth aspect, in some implementations of the fourth aspect, the sending unit is further configured to send the first identifier to a second node, where the second node is a parent node of the first node.

With reference to the fourth aspect, in some implementations of the fourth aspect, the apparatus is a donor gNB, and the donor gNB includes a distributed unit DU and a centralized unit CU. The distributed unit DU is configured to receive first configuration information sent by the centralized unit CU, where the first configuration information includes the first identifier and an IP layer identifier of the first node.

With reference to the fourth aspect, in some implementations of the fourth aspect, the distributed unit DU is specifically configured to: receive a first data packet sent by the centralized unit CU, where the first data packet includes the IP layer identifier of the first node and data, and send a second data packet to the first node, where the second data packet includes the IP layer identifier of the first node, the first identifier, and the data.

With reference to the fourth aspect, in some implementations of the fourth aspect, the apparatus is a donor gNB, and the donor gNB includes a distributed unit DU and a centralized unit CU. The centralized unit CU includes a control plane CU-CP and a user plane CU-UP. The CU-CP is specifically configured to: obtain an IP layer identifier of the first node, and send the IP layer identifier of the first node to the CU-UP.

With reference to the fourth aspect, in some implementations of the fourth aspect, the sending unit is further configured to send first request information to a second donor node, where the first request information is used to request the first node to be handed over to the second donor node. The receiving unit is further configured to receive a second identifier sent by the second donor node. The sending unit is further configured to send the second identifier to the first node, where the second identifier is used to uniquely identify the first node on a wireless backhaul link within a service range of the second donor node.

According to a fifth aspect, an identifier management apparatus is provided, where the apparatus includes: a sending unit, configured to send first indication information to a first donor node, where the first indication information is used to indicate that the first node can be configured to provide a wireless backhaul service; and a receiving unit, configured to receive a first identifier sent by the donor node, where the first identifier is used to uniquely identify the first node on a wireless backhaul link within a service range of the first donor node.

With reference to the fifth aspect, in some implementations of the fifth aspect, the first identifier includes an identifier of the first donor node and identification information specific to the first node.

With reference to the fifth aspect, in some implementations of the fifth aspect, the sending unit is further configured to send the first identifier to a second node, where the second node is a parent node of the first node.

With reference to the fifth aspect, in some implementations of the fifth aspect, when the first node is handed over from the first donor node to a second donor node, the receiving unit is further configured to receive a second identifier sent by the first donor node, where the second identifier is used to uniquely identify the first node on a wireless backhaul link within a service range of the second donor node.

According to a sixth aspect, an identifier management apparatus is provided, where the apparatus includes: a receiving unit, configured to obtain a third identifier allocated by a second node to a first node, where the third identifier is used to identify the first node in a cell served by the second node, and the first node is a child node of the second node; and a sending unit, configured to send third configuration information to a third node, where the third configuration information includes the third identifier, identification information of the cell served by the second node, and an identifier of a next-hop node of the third node, and the third node is an intermediate node between the donor node and the first node.

With reference to the sixth aspect, in some implementations of the sixth aspect, the apparatus further includes a processing unit, the receiving unit is further configured to obtain first interface identification information or second interface identification information, and the processing unit is configured to determine the first node based on the first interface identification information and/or the second interface identification information.

The first interface identification information is identification information that is allocated by the second node to the first node and that is on an interface between the donor node and the second node. The second interface identification information is identification information that is allocated by the donor node to the first node and that is on the interface between the donor node and the second node.

With reference to the sixth aspect, in some implementations of the sixth aspect, the third configuration information is included in an F1AP message or an RRC message sent by the donor node to the third node.

With reference to the sixth aspect, in some implementations of the sixth aspect, the apparatus includes a distributed unit DU and a centralized unit CU. The DU receives fourth configuration information sent by the CU, where the fourth configuration information includes the third identifier, the identification information of the cell served by the second node, and an IP layer identifier of the first node.

According to a seventh aspect, this application provides a storage medium, where the storage medium stores a computer program, and when the computer program is executed by a processor, the method in the first aspect or the second aspect is implemented.

According to an eighth aspect, this application provides a chip system, including a processor, configured to perform the method according to the first aspect or the second aspect.

According to a ninth aspect, this application provides a communications apparatus, including a processor, where the processor is coupled to a memory, the memory is configured to store a program, and when the program is executed by the processor, the communications apparatus is enabled to implement the method according to the first aspect or the second aspect.

The communications apparatus may be, for example, a terminal, a network device (for example, a base station), or a chip, a chip system, or a processor that can support the terminal or the network device in implementing the foregoing functions.

BRIEF DESCRIPTION OF DRAWINGS

FIG. 4(a) and FIG. 4(b) show a protocol stack of each node in a multi-hop IAB network according to this application;

FIG. 9 is a schematic flowchart of routing selection performed on a data packet according to an embodiment of this application;

FIG. 10 is a schematic diagram in which a CU-CP sends an IP layer identifier of an IAB node to a CU-UP;

DESCRIPTION OF EMBODIMENTS

Figures 1, 2:
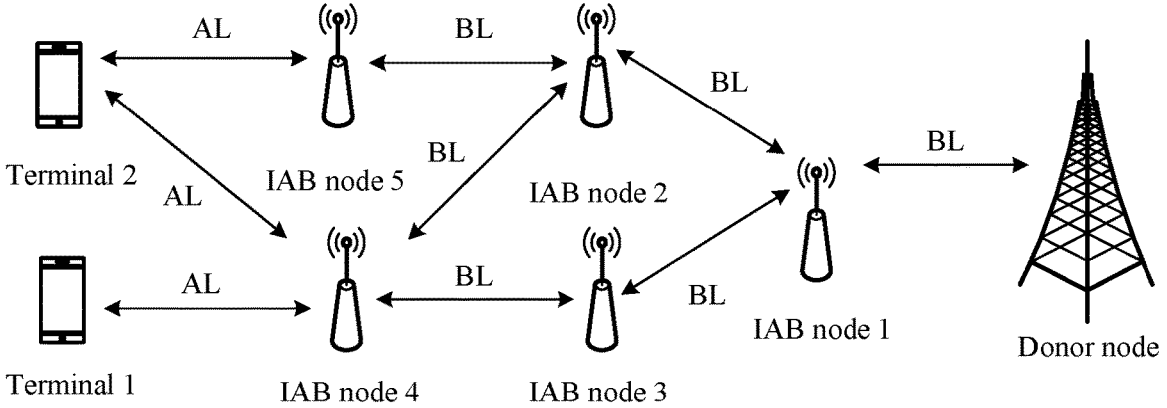
FIG. 1 is a schematic diagram of a wireless relay scenario according to an embodiment of this application.
FIG. 2 is a schematic diagram of a topology structure of an IAB network according to an embodiment of this application.

The following describes the technical solutions in embodiments of this application with reference to the accompanying drawings in the embodiments of this application.

In the descriptions of this application, unless otherwise specified, "/" means "or". For example, A/B may represent A or B. "And/or" in this specification describes an association relationship for describing associated objects and represents that there may be three relationships. For example, A and/or B may represent the following three cases: Only A exists, both A and B exist, and only B exists. In addition, in the descriptions of this application, unless otherwise specified, "a plurality of" means two or more. In addition, to clearly describe the technical solutions in the embodiments of this application, words such as "first" and "second" are used in the embodiments of this application to distinguish between same items or similar items whose functions and functions are basically the same. A person skilled in the art may understand that the words such as "first" and "second" do not intend to limit a quantity or an execution sequence, and the words such as "first" and "second" do not indicate a definite difference.

The technical solutions in the embodiments of this application may be applied to various communications systems, for example, orthogonal frequency division multiple access (OFDMA), single carrier frequency division multiple access (SC-FDMA), and other systems. The terms "system" and "network" can be interchanged with each other. A radio technology such as evolved universal terrestrial radio access (E-UTRA) or ultra mobile broadband (UMB) may be implemented in an OFDMA system. The E-UTRA is an evolved release of a universal mobile telecommunications system (UMTS). The 3rd generation partnership project (3 GPP) uses a new release of the E-UTRA in long term evolution (LTE) and various versions evolved based on LTE. A fifth generation (5G) communications system using new radio (NR) is a next-generation communications system under research. In addition, the communications systems may further be applicable to a future-oriented communications technology, and are applicable to the technical solutions provided in the embodiments of this application.

Network elements in this application include a terminal and a wireless backhaul node.

The terminal in the embodiments of this application may alternatively be referred to as user equipment (UE), an access terminal, a subscriber unit, a subscriber station, a mobile station, a remote station, a remote terminal, a mobile device, a user terminal, a wireless communications device, a user agent, or a user apparatus. Alternatively, the terminal may be a station (ST) in a wireless local area network (WLAN), or may be a cellular phone, a cordless phone, a session initiation protocol (SIP) phone, a wireless local loop (WLL) station, a personal digital assistant (PDA) device, a handheld device having a wireless communication function, a computing device or another processing device connected to a wireless modem, a vehicle-mounted device, or a wearable device (which may also be referred to as a wearable intelligent device). The terminal may alternatively be a terminal in a next-generation communications system, for example, a terminal in 5G or a terminal in a future evolved public land mobile network (PLMN).

The wireless backhaul node is configured to provide a wireless backhaul service for a node (for example, a terminal) wirelessly accessing the wireless backhaul node. The wireless backhaul service is a data and/or signaling backhaul service provided by using a wireless backhaul link.

A system architecture and a service scenario that are described in the embodiments of this application are intended to describe the technical solutions in the embodiments of this application more clearly, and do not constitute a limitation to the technical solutions provided in the embodiments of this application. A person of ordinary skill in the art may know that with evolution of a network architecture and emergence of a new service scenario, the technical solutions provided in the embodiments of this application are also applicable to similar technical problems. In the embodiments of this application, an example in which a provided method is applied to an NR system or a 5G network is used for description. However, it should be noted that the method provided in the embodiments of this application may also be applied to another network, for example, may be applied to an evolved packet system (EPS) network (namely, a 4th generation (4G) network that is usually mentioned). Correspondingly, when the method provided in the embodiments of this application is applied to the EPS network, a network node performing the method provided in the embodiments of this application is replaced with a network node in the EPS network. For example, when the method provided in the embodiments of this application is applied to the 5G network or the NR system, a wireless backhaul node in the following descriptions may be a wireless backhaul node in the 5G network. For example, the wireless backhaul node in the 5G network may be referred to as an IAB node, and certainly may also have another name. This is not specifically limited in the embodiments of this application. When the method provided in the embodiments of this application is applied to the EPS network, a wireless backhaul node in the following descriptions may be a wireless backhaul node in the EPS network. For example, the wireless backhaul node in the EPS network may be referred to as a relay node (RN).

With development of technologies such as virtual reality (VR), augmented reality (AR), and the internet of things, there will be more terminals in a future network, and usage of network data will also continuously increase. To adapt to an increasing quantity of terminals and rapidly increasing usage of network data in the market, higher requirements are imposed on the capacity of the 5G network currently. In a hotspot area, to meet a 5G ultra-high capacity requirement, using high-frequency small cells for networking becomes more popular. High-frequency carriers have a poor propagation characteristic, are severely attenuated if blocked, and have small coverage. Therefore, a large quantity of small cells need to be densely deployed in the hotspot area. These small cells may be IAB nodes.

To design a flexible and convenient access and backhaul solution, a wireless transmission solution is applied to both an access link (AL) and a backhaul link (BL) in an IAB scenario.

In a network (which is briefly referred to as an IAB network below) including an IAB node, the IAB node may provide a wireless access service for a terminal, and is connected to a donor node through a wireless backhaul link to transmit service data of a user. For example, the donor node may be a donor gNB. The donor node may be briefly referred to as an IAB donor or a DgNB (namely, a donor gNodeB) in the 5G network. The donor node may be a complete entity, or may be a form in which a centralized unit (CU) (which is briefly referred to as a donor-CU in this specification, or may be briefly referred to as a CU) and a distributed unit (DU) (which is briefly referred to as a donor-DU in this specification) are separated, that is, the donor node consists of the donor-CU and the donor-DU. In the embodiments of this application and the accompanying drawings, an example in which the donor node includes the donor-CU and the donor-DU is used to describe the method provided in the embodiments of this application.

The donor-CU may alternatively be a form in which a user plane (UP) (which is briefly referred to as a CU-UP in this specification) and a control plane (CP) (which is briefly referred to as a CU-CP in this specification) are separated, that is, the donor-CU consists of the CU-CP and the CU-UP.

The IAB node is connected to a core network through the donor node through a wired link. For example, in a 5G standalone architecture, an IAB node is connected to a core network (5GC) of a 5G network through a donor node through a wired link. In a 5G non-standalone architecture, an IAB node is connected to an evolved packet core (EPC) on a control plane through an evolved NodeB (eNB), and is connected to the EPC on a user plane through a donor node and the eNB.

To ensure reliability of service transmission, the IAB network supports multi-hop IAB nodes and multi-connection IAB nodes for networking. Therefore, there may be a plurality of transmission paths between the terminal and the donor node. On a path, there is a definite hierarchical relationship between IAB nodes and between an IAB node and the donor node serving the IAB node. Each IAB node considers a node that provides a backhaul service for the node as a parent node. Correspondingly, each IAB node may be considered as a child node of a parent node of the IAB node.

For example, referring to FIG. 1, a parent node of an IAB node 1 is a donor node, the IAB node 1 is a parent node of an IAB node 2 and an IAB node 3, both the IAB node 2 and the IAB node 3 are parent nodes of an IAB node 4, and a parent node of an IAB node 5 is the IAB node 3. An uplink data packet of a terminal may be transmitted to the donor node through one or more IAB nodes, and then is sent by the donor node to a mobile gateway device (for example, a user plane function (UPF) network element in a 5G network). After the donor node receives a downlink data packet from the mobile gateway device, the donor node sends the down-link data packet to the terminal through the one or more IAB nodes. There are two available paths for data packet trans-mission between a terminal 1 and the donor node: the terminal 1→the IAB node 4→the IAB node 3→the IAB node 1→the donor node, and the terminal 1→the IAB node 4→the IAB node 2→the IAB node 1→the donor node. There are three available paths for data packet transmission between a terminal 2 and the donor node: the terminal 2→the IAB node 4→the IAB node 3→the IAB node 1→the donor node, the terminal 2→the IAB node 4→the IAB node 2→the IAB node 1→the donor node, and the terminal 2→the IAB node 5→the IAB node 2→the IAB node 1→the donor node.

It may be understood that, in the IAB network, one transmission path between the terminal and the donor node may include one or more IAB nodes. Each IAB node needs to maintain a wireless backhaul link communicating with a parent node, and further needs to maintain a wireless link with a child node. If an IAB node is a node accessed by the terminal, a wireless access link is established between the IAB node and a child node (namely, the terminal). If an IAB node is a node that provides a backhaul service for another IAB node, a wireless backhaul link is established between the IAB node and a child node (namely, the another IAB node). For example, referring to FIG. 1, in the path "the terminal 1→the IAB node 4→the IAB node 3→the IAB node 1→the donor node", the terminal 1 accesses the IAB node 4 by using a wireless access link, the IAB node 4 accesses the IAB node 3 by using a wireless backhaul link, the IAB node 3 accesses the IAB node 1 by using a wireless backhaul link, and the IAB node 1 accesses the donor node by using a wireless backhaul link.

For example, the IAB node may be a device such as customer premises equipment (CPE) or a home gateway (RG). In this case, the method provided in the embodiments of this application may further be applied to a home access scenario.

The foregoing IAB networking scenario is merely an example. In an IAB scenario in which multi-hop and multi-connection are combined, there are more other possibilities in the IAB networking scenario. For example, a donor node and an IAB node connected to another donor node form a dual connection to serve a terminal. The possibilities are not listed one by one herein.

To make the embodiments of this application clearer, the following collectively describes some content and concepts related to the embodiments of this application.

1. a Link, a Previous-Hop Node of a Node, a Next-Hop Node of a Node, an Ingress Link of a Node, and an Egress Link of a Node The link is a path between two neighboring nodes on a path.

The previous-hop node of the node is the last node that is on a path including the node and that receives a data packet before the node.

The next-hop node of the node is the Pt node that is on a path including the node and that receives a data packet after the node.

The ingress link of the node is a link between the node and a previous-hop node of the node, and may also be referred to as a previous-hop link of the node.

The egress link of the node is a link between the node and a next-hop node of the node, and may also be referred to as a next-hop link of the node.

2. An Access IAB Node and an Intermediate IAB Node

The access IAB node in the embodiments of this appli-cation is an IAB node accessed by a terminal, and the intermediate IAB node is an IAB node that provides a wireless backhaul service for another IAB node (for example, the access IAB node or another intermediate IAB node).

For example, referring to FIG. 1, in the path "the terminal 1→the IAB node 4→the IAB node 3→the IAB node 1→the donor node", the IAB node 4 is an access IAB node, and the IAB node 3 and the IAB node 1 are intermediate IAB nodes. The IAB node 3 provides a backhaul service for the IAB node 4, and the IAB node 1 provides a backhaul service for the IAB node 3.

It should be noted that, for a terminal that accesses an IAB node, the IAB node is an access IAB node. For a terminal that accesses another IAB node, the IAB node is an inter-mediate IAB node. Therefore, whether an IAB node is specifically an access IAB node or an intermediate IAB node is not fixed, and needs to be determined based on a specific application scenario.

3. Composition of an IAB Node

The IAB node may play a role of a mobile terminal (MT) and a role of a DU. When the IAB node communicates with a parent node of the IAB node, the IAB node may be considered as a terminal. In this case, the IAB node serves as the MT. When the IAB node communicates with a child node of the IAB node (where the child node may be a terminal or a mobile terminal part of another IAB node), the IAB node may be considered as a network device. In this case, the IAB node serves as the DU. Therefore, it may be considered that the IAB node consists of an MT part and a DU part. An IAB node may establish a backhaul connection to at least one parent node of the IAB node by using the MT part. The DU part of an IAB node may provide an access service for a terminal or an MT part of another IAB node.

For example, referring to FIG. 2, a terminal is connected to a donor node through an IAB node 2 and an IAB node 1. The IAB node 1 and the IAB node 2 each include a DU part and an MT part. The DU part of the IAB node 2 provides an access service for the terminal. The DU part of the IAB node 1 provides an access service for the MT part of the IAB node 2. A donor-DU provides an access service for the MT part of the IAB node 1.

4. a Protocol Stack Architecture of an Intermediate IAB Node, an Access IAB Node, a Donor-DU, a Donor-CU, and a Terminal The intermediate IAB node has a same protocol stack on a user plane and control plane. An MT part and a DU part of the intermediate IAB node may not share an adapt layer, for example, in FIG. 3(*a*). The MT part and the DU part of the intermediate IAB node may alternatively share an adapt layer, for example, in FIG. 3(*b*).

Protocol stacks of the access IAB node on the user plane and the control plane are different. For details, refer to FIG. 3(*c*) and FIG. 3(*d*).

Figures 3A, 3B, 3C, 3D:
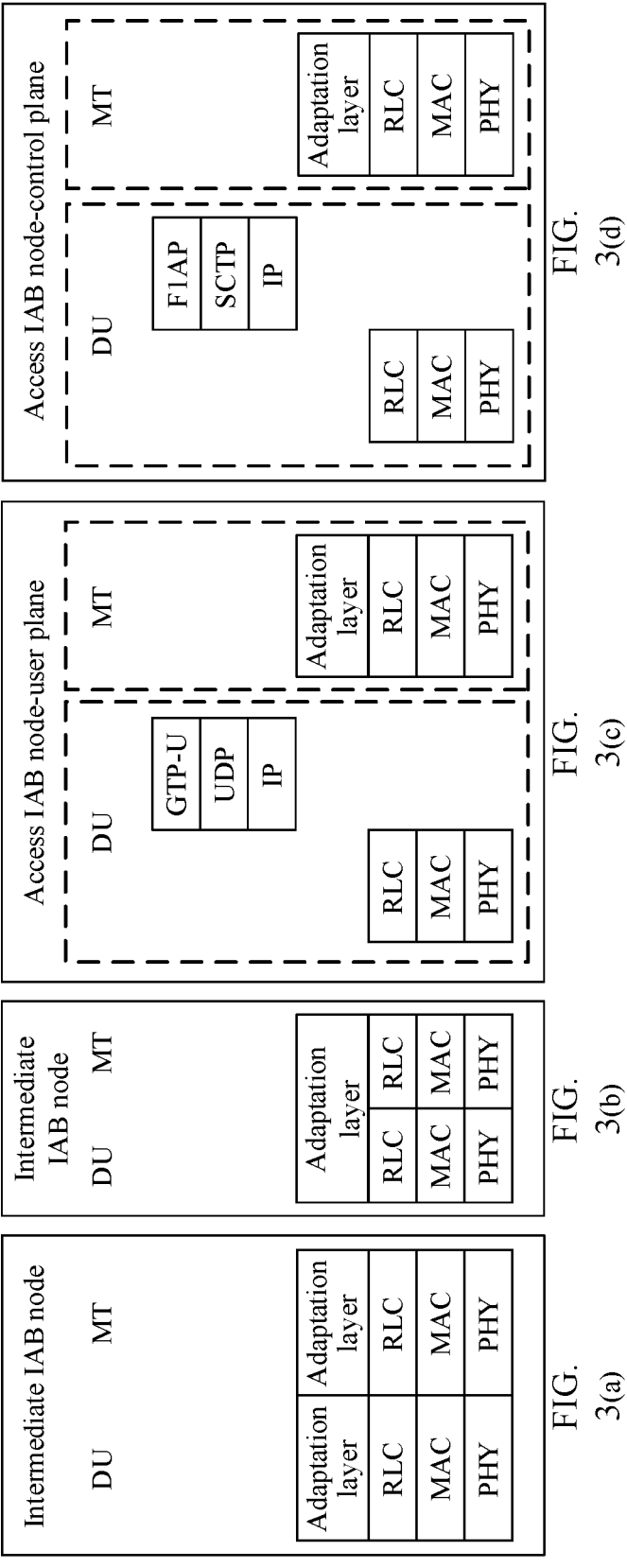
FIG. 3(a), FIG. 3(b), FIG. 3(c), and FIG. 3(d) show a protocol stack architecture of an intermediate IAB node and an access IAB node.

For example, based on the example shown in FIG. 3(*a*), FIG. 3(*b*), FIG. 3(*c*), and FIG. 3(*d*), for an architecture of a user plane protocol stack of each node, refer to FIG. 4(*a*), and for an architecture of a control plane protocol stack of each node, refer to FIG. 4(*b*). In FIG. 4(*a*) and FIG. 4(*b*), drawing is performed by using an example in which the MT part and the DU part of the intermediate IAB node do not share the adapt layer. Meanings of protocol layers in FIG. 3(*a*), FIG. 3(*b*), FIG. 3(*c*), and FIG. 3(*d*) and FIG. 4(*a*) and FIG. 4(*b*) are a packet data convergence protocol (PDCP) layer, a general packet radio service tunneling protocol user plane (GTP-U) layer, a user datagram protocol (UDP) layer, an internet protocol (IP) layer, an L2 (layer 2) layer, an L1 (layer 1) layer, a radio link control (RLC) layer, a media access control (MAC) layer, a physical (PHY) layer, a radio resource control (RRC) layer, an F1 application protocol (F1AP) layer, and a stream control transmission protocol (SCTP) layer. The L2 layer is a link layer. For example, the L2 layer may be a data link layer in an open systems interconnection (OSI) reference model. The L1 layer may be a physical layer. For example, the L1 layer may be a physical layer in the OSI reference model.

It should be noted that in FIG. 4(*a*) and FIG. 4(*b*), drawing is performed by using an example in which the donor node includes a donor-DU and a donor-CU. Therefore, protocol layers of the donor-DU and the donor-CU are shown in FIG. 4(*a*) and FIG. 4(*b*). If the donor node is an entity with complete functions, the donor node only needs to keep protocol stacks of interfaces of the donor-DU and the donor-CU to an external node, and a protocol layer on an internal interface between the donor-DU and the donor-CU is not required.

In addition, it should be noted that, regardless of an architecture of a control plane protocol stack or an architecture of a user plane protocol stack, when the donor-DU is an agent node of an F1 interface between the donor-CU and an IAB node, in an architecture of a protocol stack that is in the donor-DU and that corresponds to the IAB node, above an IP layer, a UDP layer and a GTP-U layer that respectively correspond to a UDP layer and a GTP-U layer in an architecture of a protocol stack of a DU part of the access IAB node are further included.

5. An F1 Interface and a Protocol Layer of the F1 Interface

The F1 interface is a logical interface between a DU part of an IAB node and a donor node (or a donor-CU or donor-DU). The F1 interface may also be referred to as an F1* interface that supports a user plane and a control plane. The protocol layer of the F1 interface refers to a communication protocol layer on the F1 interface.

For example, a user plane protocol layer of the F1 interface may include one or more of an IP layer, a UDP layer, and a GTP-U layer. Optionally, the user plane protocol layer of the F1 interface further includes a PDCP layer and/or an IP security (IPsec) layer.

For example, a control plane protocol layer of the F1 interface may include one or more of an IP layer, an F1AP layer, and an SCTP layer. Optionally, the control plane protocol layer of the F1 interface further includes one or more of a PDCP layer, an IPsec layer, and a datagram transport layer security (DTLS) layer.

Embodiment 1

Figure 5:
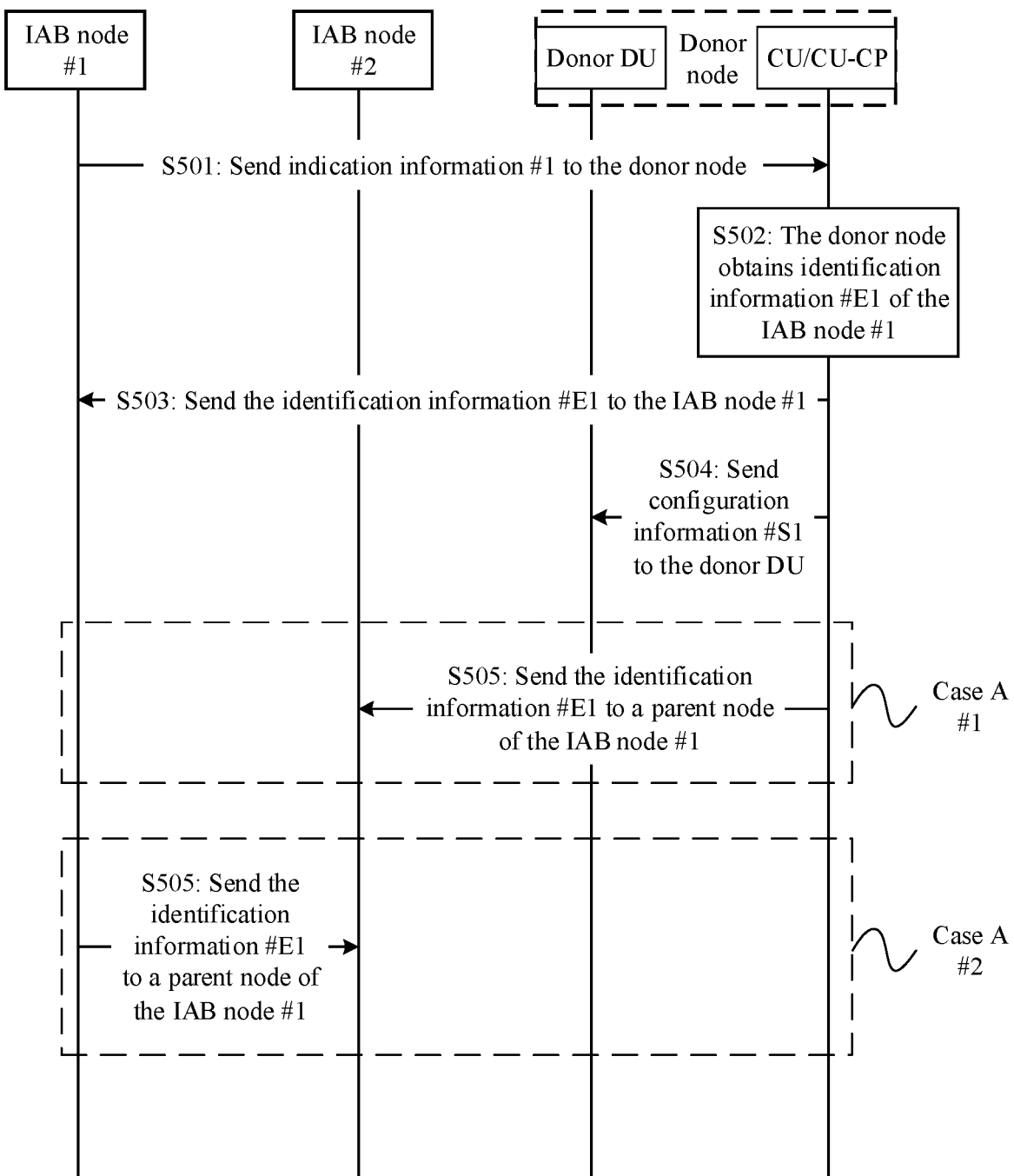
FIG. 5 is a schematic interaction diagram of an identifier management method according to an embodiment of this application.

FIG. 5 is a schematic interaction diagram of an identifier management method according to an embodiment of this application. Referring to FIG. 5, an IAB donor node may allocate an identifier to an IAB node #1. The IAB donor node is wiredly connected to a core network, and the IAB node #1 is connected to the IAB donor node by using a wireless backhaul link, so that UE served by the IAB node #1 is connected to the core network.

In S501, the IAB node #1 sends indication information #1 to the donor node.

In a startup process, the IAB node #1 accesses a network as an MT by using a parent node. After accessing the network or in a process of accessing the network, the IAB node #1 may send the indication information #1 to the donor node, indicating that the IAB node #1 is an IAB node and can be used to provide wireless access and wireless backhaul services. For example, the IAB node #1 includes the indication information in an RRC message sent to the IAB donor, where the indication information is used to indicate that the IAB node #1 is an integrated access and backhaul node, and can be used to provide wireless access and wireless backhaul services. Alternatively, in the process of accessing the network, the IAB node #1 initiates a random access request to the parent node by using a random access resource, where the random access resource is a resource specifically used by an IAB node to randomly access the network rather than used by a terminal to perform random access. Therefore, after the random access of the IAB node #1 succeeds, the parent node includes indication information in an uplink F1AP message (for example, an F1AP message carrying an uplink RRC message of the IAB node #1) sent to the donor node, where the indication information is used to indicate that anode (namely, the IAB node #1) currently accessing the network is an integrated access and backhaul node.

Optionally, if the donor node includes a donor CU (CU for short) part and a donor DU part, the IAB node #1 sends the indication information #1 to the CU by using the donor DU.

In S502, the donor node obtains identification information #E1 of the IAB node #1.

A manner in which the donor node obtains the identification information #E1 of the IAB node #1 may be: receiving the identification information #E1 of the IAB node #1 from a core network element. Alternatively, a manner in which the donor node obtains the identification information #E1 of the IAB node #1 may be: The donor node IAB donor receives the indication information sent by the IAB node #1, and determines that the IAB node #1 is an integrated access and backhaul node. The donor node allocates the identification information #E1 to the IAB node #1, where the identification information #E1 is used to uniquely identify the IAB node #1 on a wireless backhaul link within a range served by the donor node. Optionally, a manner in which the donor node determines that the IAB node #1 is the integrated access and backhaul node may be that the donor node receives, from a core network element (for example, an access and mobility management function (AMF) unit in a 5G core network), acknowledgment information indicating that identity authentication on the IAB node #1 succeeds, the donor node receives, from a base station in LTE, the indication information indicating that the IAB node #1 is the integrated access and backhaul node, or the like.

By way of example and not limitation, the identification information #E1 is an adaptation layer identifier (adapt ID) of the IAB node #1. The adaptation layer identifier is unique within the service range of the donor node and can be used for routing a data packet sent or received by the IAB node #1 in a backhaul link. Different IAB nodes served by the donor node have different adaptation layer identifiers.

Optionally, the identification information #E1 includes an identifier of the donor node and identification information specific to the IAB node #1.

By way of example and not limitation, the identification information #E1 may alternatively be any one of the following identifiers: an identifier (for example, an IAB-DU ID configured by an OAM for an IAB node) of a DU part of the IAB node #1; an IP address that is of the IAB node #1 and that may be specifically, for example, an IP address that an OAM allocates to the IAB node #1, an IP address allocated by a core network element such as a session management function (SMF) unit to the IAB node #1, an IP address allocated by a dynamic host configuration protocol (DHCP) server to the IAB node #1, or an IP address obtained by the IAB node #1 in an IPv6 stateless address autoconfiguration manner; a cell identifier that is of a cell served by a DU part of the IAB node #1 and that may be specifically a physical cell identifier (PCI), a global cell identifier (ECGI) in a 4G network, a cell identifier (ECI) in a 4G network, a global cell identifier (NCGI) in an NR network, a cell identity (NCI) in an NR network, or the like; an identifier allocated by a core network element AMF/MME to an MT part of an IAB node, where for example, the identifier may be of various temporary mobile subscriber identities (TMSI) or may be a globally unique temporary identity (GUTI) such as an MME-TMSI, a 5G-TMSI, a 4G-GUTI, or a 5G-GUTI; or a cell identifier (such as a PCI, an ECI, an NCI, an ECGI, or an NCGI) of a cell served by the parent node of the IAB node #1 for the IAB node #1 and an intra-cell identifier C-RNTI allocated by the parent node to the IAB node #1 in the cell.

In S503, the donor node sends the identification information #E1 to the IAB node #1.

For example, the donor node may send the identification information #E1 to an MT part of the IAB node #1 by using an RRC message, or the CU sends the identification information #E1 to the DU part of the IAB node #1 by using an F1AP message.

It should be understood that if a donor node includes the donor CU (CU for short) part and the donor DU part, the donor node in this embodiment of this application may be alternatively replaced with the CU for understanding. Optionally, if the CU includes a CU-CP and a CU-UP, the donor node in this embodiment of this application may be replaced with the CU-CP for understanding.

Step S503 is an optional step. If step S503 is not performed, when #E1 is an identifier allocated by the donor node to the IAB node #1, after the IAB node #1 receives a data packet carrying the identifier #E1 (where for example, an identifier that is of a target node and that is carried in a data packet at an adaptation layer is #E1), the IAB node #1 does not know which node #E1 identifies. In this case, the IAB node #1 may consider that the IAB node #1 is the target node, and may deliver the data packet to an upper-layer protocol layer after performing receiving processing (for example, remove adaptation layer header information) on the data packet at the adaptation layer. The upper-layer protocol layer may be, for example, an IP layer.

In an optional embodiment, as shown in FIG. 5, if the donor node includes the donor CU part and the donor DU part, the method provided in this embodiment of this application further includes the following step.

S504. The CU sends configuration information #S1 to the donor DU, where the configuration information #S1 includes the identification information #E1 of the IAB node #1 and an IP layer identifier of the IAB node #1.

Optionally, the configuration information #S1 further includes identification information #E2 of an IAB node #2, where the IAB node #2 is a child node of the donor DU of the donor node, namely, a next-hop node of the donor DU from the donor DU to the IAB node #1.

When the CU is in a form in which the control plane (CP) and the user plane (UP) are separated, the CU in step S504 may be alternatively replaced with the CU-CP for understanding.

When the donor node is in a form in which the CU and the DU are separated, data needs to be forwarded between the CU and the IAB node #1 by using the donor DU. Therefore, the CU sends the configuration information #S1 to perform route configuration on the donor DU. Because data packet routing is performed between the CU and the donor DU by using an IP layer, the donor DU performs the data packet routing by using an adaptation layer on a backhaul link. Route configuration information sent by the CU to the donor DU includes the identification information #E1 of the IAB node #1 and the IP layer identifier of the IAB node #1. Therefore, the donor DU may maintain a correspondence between the identification information #E1 of the IAB node #1 and the IP layer identifier, so that the donor DU conveniently adds the identification information #E1 of the IAB node #1 to the downlink data packet #D1 when the donor DU receives a downlink data packet #D1 whose IP layer destination address is the IP layer identifier of the IAB node #1. Therefore, routing is performed when the downlink data packet #D1 is transmitted on the wireless backhaul link. The CU configures, for the donor DU, identifiers of next-hop nodes of the IAB node #1, so that the donor DU can select a proper next-hop node for the data packet that is to be sent to the IAB node #1.

Optionally, the configuration information #S1 sent by the CU to the donor DU may be included in an F1AP message sent by the CU to the donor DU, and is transmitted by using a corresponding F1AP protocol layer between the CU and the donor DU.

In an optional embodiment, as shown in FIG. 5, the method provided in this embodiment of this application further includes the following step.

In S505, the identification information #E1 is sent to the parent node of the IAB node #1.

In S505, there are two different cases separately described below.

Case 1: The donor node sends the identification information #E1 of the IAB node #1 to the parent node of the IAB node #1.

Case 2: The IAB node #1 sends the identification information #E1 of the IAB node #1 to the parent node of the IAB node #1.

For example, in FIG. 5, the IAB node #2 is the parent node of the IAB node #1. Therefore, for example, in case 1, the donor node may send the identification information #E1 of the IAB node #1 to an MT part of the IAB node #2 by using an RRC message. Alternatively, the donor node may send the identification information #E1 of the IAB node #1 to a DU part of the IAB node #2 by using an F1AP message. For example, in case 2, the IAB node #1 may send the identification information #E1 to the IAB node #2 by using a control element at a MAC layer.

The parent node (for example, the IAB node #2 in FIG. 5) of the IAB node #1 may allocate identification information #E3 to the IAB node #1, where the identification information #E3 is used to identify the IAB node #1 in a cell served by the IAB node #2. For example, the identification information #E3 may be a cell radio network temporary identifier (C-RNTI) allocated by the parent node to the MT part of the IAB node #1.

In case 1, the message sent by the donor node to the parent node (such as the IAB node #2) of the IAB node #1 includes the identification information #E1 of the IAB node #1, and may further include at least one of the following information: a cell identifier #Cell_ID of a cell served by the IAB node #2 for the IAB node #1, and an identifier #E3 (such as a C-RNTI of the IAB node #1) that is of the IAB node #1 in the cell served by the IAB node #2 and that is allocated by the IAB node #2 to the IAB node #1, an identifier #E5 (such as an IAB-DU F1AP UE ID allocated by the IAB node #2 to the IAB node #1), on an interface (such as an F1 interface between the IAB node #2 and the donor node) between the donor node and the IAB node #2, allocated by the IAB node #2 to the IAB node #1, or an identifier #E6 (such as an IAB donor CU F1AP UE ID allocated by the donor node to the IAB node #1), on an interface (such as the F1 interface between the IAB node #2 and the donor node) between the donor node and the IAB node #2, allocated by the donor node to the IAB node #1.

In case 1, the message sent by the donor node to the IAB node #2 includes #E1 and further includes #E5 and/or #E6, and the IAB node #2 may determine the IAB node #1 based on #E5 and/or #E6. The identification information #E3, of the IAB node #1, in the cell (namely, the cell identified by #Cell_ID) served by the IAB node #2 is allocated by the parent node IAB node #2. The IAB node #2 may pre-maintain a correspondence between #E3 and #E5, and/or a correspondence between #E3 and #E6, or the IAB node #2 pre-maintains a correspondence between #Cell_ID, #E3, and #E5, and/or a correspondence between Cell_ID, #E3, and #E6. The parent node of the IAB node #1 may determine, based on the message received from the donor node, that #E1 corresponds to #E3, or that #E1 corresponds to #Cell_ID and corresponds to #E3.

Alternatively, if the message sent by the donor node to the parent node of the IAB node #1 includes #E1, the cell identifier #Cell_ID of the cell served by the IAB node #2 for the IAB node #1, and the intra-cell identifier #E3 allocated by the IAB node #2 to the IAB node #1, the IAB node #2 may directly maintain a correspondence between the identification information #E1 and #E3 of the IAB node #1 based on content in the message, or the IAB node #2 may directly maintain a correspondence between the identification information #E1, #Cell_ID, and #E3 based on content in the message.

In case 2, when the IAB node #1 sends the identification information #E1 to the parent node IAB node #2, the identifier #E3 allocated in the cell (namely, the cell identified by #Cell_ID) of the parent node is used. Therefore, when receiving the message, including the identification information #E1, sent by the IAB node #1, the parent node of the IAB node #1 may directly determine the correspondence between #E1 and #E3, or may directly determine the correspondence between #E1, #Cell_ID, and #E3.

TABLE 1

| Identifiers, of a child node, maintained by the IAB node # 2 | | | | |
|---|---|---|---|---|
| Cell identifier of a cell in which the child node is located | C-RNTI of the child node | F1 interface identifier allocated by the node to the child node | F1 interface identifier allocated by the donor node to the child node | Obtained identifier of the child node |
| #Cell_ID | #E3 | #E5 | #E6 | #E1 |

After step S505, the IAB node #2 may maintain the correspondence between the identification information #E1 of the IAB node #1 and the identification information #E3 of the IAB node #1, or the IAB node #2 may maintain the correspondence between the identification information #E1 of the IAB node #1, the cell identifier #Cell_ID of the cell in which the IAB node #2 is located, and the identification information #E3 of the IAB node #1. When determining, based on the identification information #E1, to send the data packet #D1 to the IAB node #1, the IAB node #2 sends, by using the identification information #E3, the data packet #D1 to the IAB node #1 in the cell (namely, the cell identified by #Cell_ID) served by the IAB node #2.

By using the method shown in this embodiment of this application, an IAB node may obtain identification information on the wireless backhaul link within the service range of a donor node, and the identification information may be used as routing information of a data packet on the wireless backhaul link. Therefore, a routing problem of the data packet on the wireless backhaul link can be resolved.

Figures 6, 7:
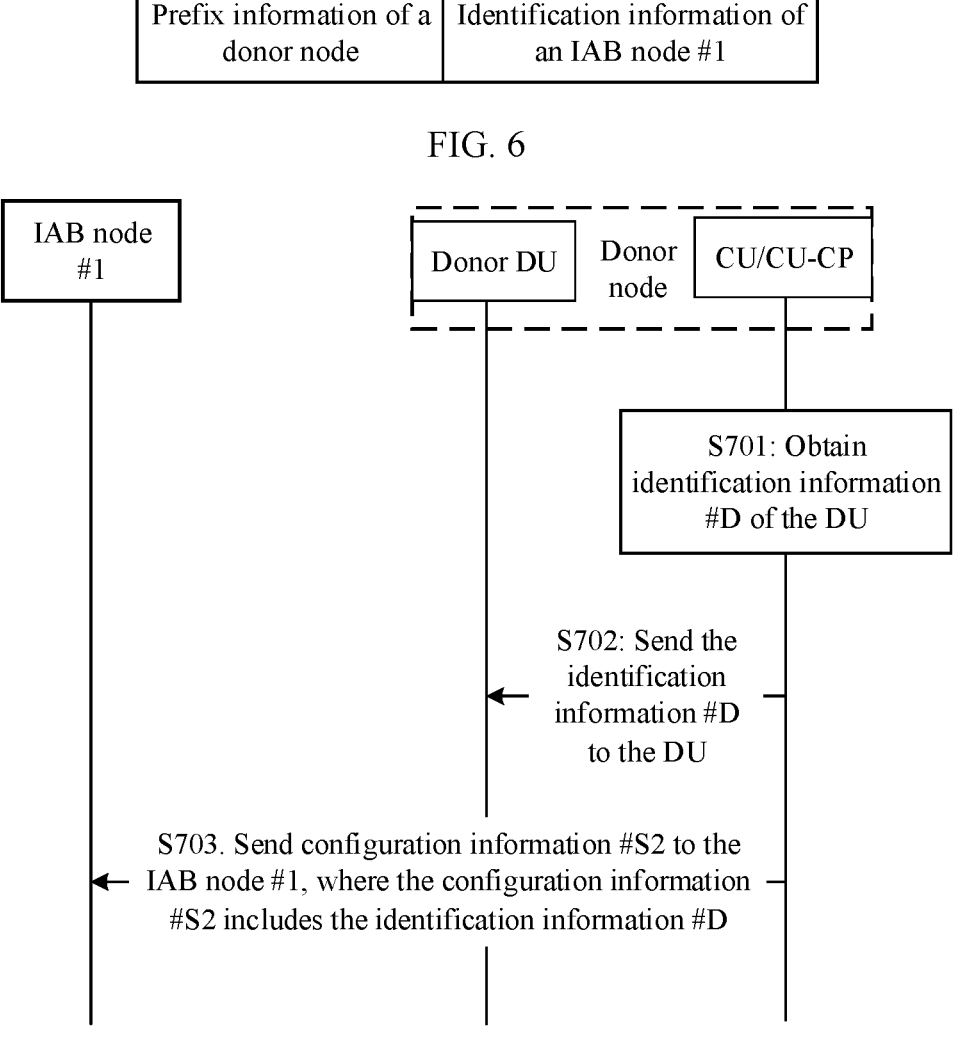
FIG. 6 is a schematic diagram of identification information allocated by a donor node CU to an IAB node.
FIG. 7 is a schematic interaction diagram of another identifier management method according to an embodiment of this application.

FIG. 6 is a schematic diagram of identification information allocated by a donor node to an IAB node.

In this embodiment of this application, the donor node may allocate identification information #E1 to the IAB node, where the identification information #E1 is used to uniquely identify an IAB node #1 on a wireless backhaul link within a service range of the donor node. In a possible example, the identification information #E1 includes an identifier (prefix information specific to the donor node) of the donor node and identification information specific to the IAB node #1.

Embodiment 2

FIG. 7 is a schematic interaction diagram of another identifier management method according to this application.

In S701, a CU obtains an adaptation layer identifier #D1 of a donor DU.

For example, the CU may receive the adaptation layer identifier #D1 of the DU from a core network element, or the CU allocates the adaptation layer identifier #D1 to the donor DU, or a message received by the CU from the donor DU carries the adaptation layer identifier #D1 of the donor DU. The adaptation layer identifier #D1 of the donor DU is used for uplink routing of a data packet on a wireless backhaul link. For example, the identifier #D1 may be any one of the following: an IAB donor DU ID obtained by the donor DU from an OAM, an IP address of the donor DU, a cell identifier (such as a PCI, an ECI, an ECGI, an NGI, and an NCGI) of a cell served by the donor DU, or a unique identifier that is allocated by the CU to the donor DU and that is within a service range of the CU.

In S702, the CU sends the adaptation layer identifier #D1 to the donor DU.

For example, the CU sends the adaptation layer identifier #D1 to the donor DU by using an F1AP message.

Step S702 is an optional step. If in step S701, a manner in which the CU obtains the adaptation layer identifier #D1 of the donor DU is "the message received by the CU from the donor DU carries the adaptation layer identifier #D1 of the donor DU", step S702 is not required.

In S703, the CU sends configuration information #S2 to an IAB node #1, where the configuration information #S2 includes the adaptation layer identifier #D1 of the donor DU.

For example, the CU may send the configuration information #S2 to the IAB node #1 by using an RRC message (for example, an RRC message sent to an MT part of the IAB node #1). Alternatively, the CU sends the configuration information #S2 to the IAB node #1 by using an F1AP message (for example, an F1AP message sent to a DU part of the IAB node #1).

Optionally, the configuration information #S2 further includes an identifier #N of a next-hop node in uplink transmission from the IAB node #1 to the donor DU. For example, a parent node of the IAB node #1 is an IAB node #2. In this case, in the uplink transmission from the IAB node #1 to the donor DU, a next-hop node of the IAB node #1 is the IAB node #2, and the identifier #N is an identifier of the IAB node #2. For example, the identifier #N may be specifically any one of the following: an IP address of the IAB node #2, a cell identifier (for example, a PCI, an ECI, an ECGI, an NGI, and an NCGI) of a cell served by the IAB node #2, an adaptation layer identifier allocated by the CU to the IAB node #2, and an identifier of a cell group to which a cell served by the IAB node #2 belongs for the IAB node #1.

Therefore, when sending uplink data to the donor node, the IAB node #1 may add routing information and perform route selection based on the configuration information #S2.

Embodiment 3

Figure 8:
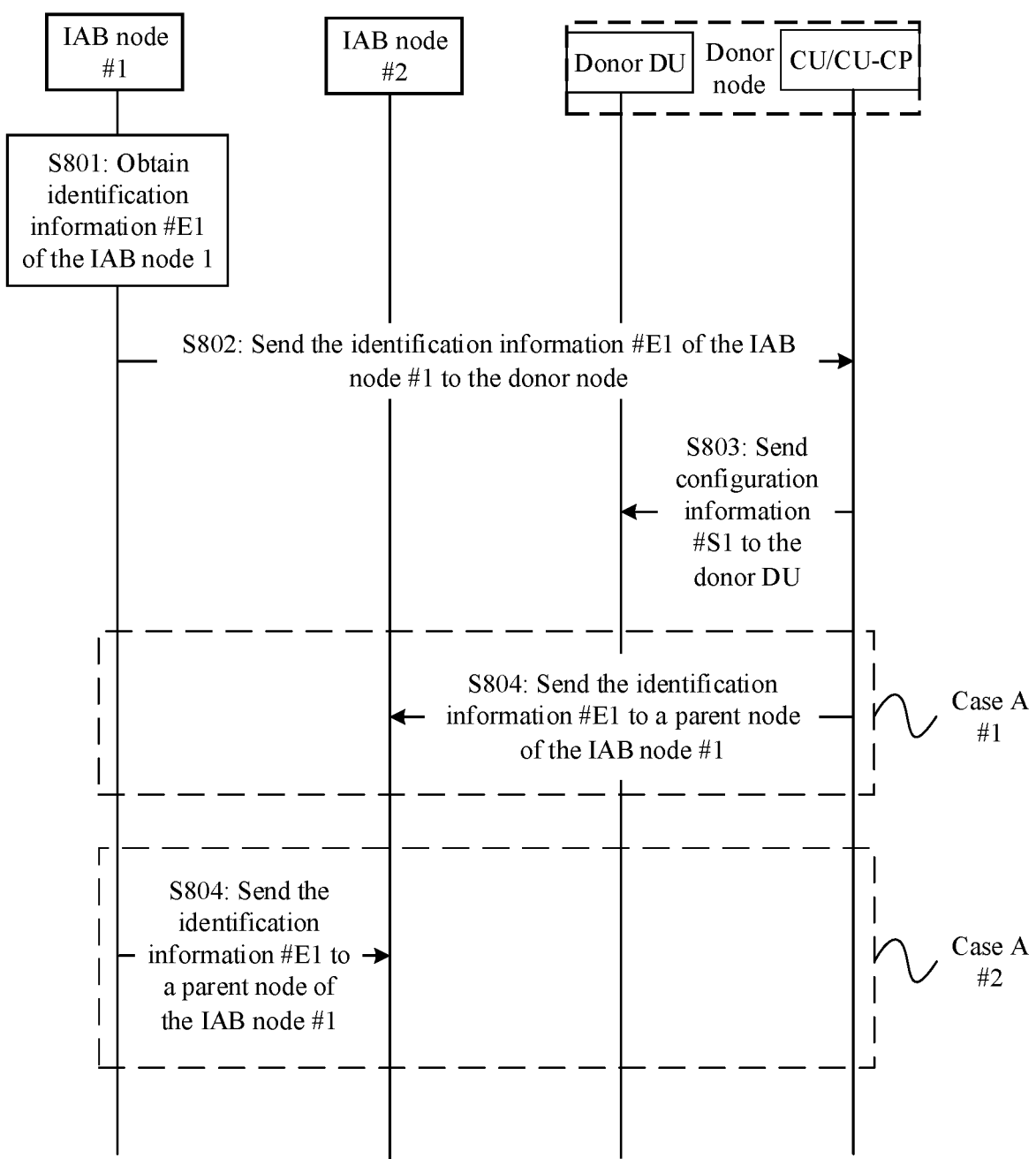
FIG. 8 is a schematic interaction diagram of still another identifier management method according to an embodiment of this application.

FIG. 8 is a schematic interaction diagram of still another identifier management method according to this application. Referring to FIG. 8, identification information that is of an IAB node and that is used for wireless backhaul routing is configured on a network side, and the IAB node may obtain the identification information from a management network element in a core network.

In S801, an IAB node #1 obtains identification information #E1 of the IAB node #1.

The IAB node #1 obtains the identification information #E1 from a management network element in a core network, where the identification information #E1 is used to uniquely identify the IAB node #1 on a wireless backhaul link within a service range of a donor node.

The identification information #E1 may be any one of the following identifiers: an identifier (for example, an IAB-DU ID configured by an OAM for an IAB node) of a DU part of the IAB node #1; an IP address that is of the IAB node #1 and that may be specifically, for example, an IP address obtained by the IAB node #1 from the OAM, an IP address allocated by a core network element such as a session management function (SMF) unit to the IAB node #1, an IP address allocated by a dynamic host configuration protocol (DHCP) server to the IAB node #1, or an IP address obtained by the IAB node #1 in an IPv6 stateless address autoconfiguration manner; a cell identifier that is of a cell served by a DU part of the IAB node #1 and that may be specifically a physical cell identifier (PCI), a global cell identifier (ECGI) in a 4G network, a cell identifier (ECI) in a 4G network, a global cell identifier (NCGD in a 5G NR network, a cell identity (NCI) in a 5G NR network, or the like; an identifier allocated by a core network element AMF/MME to an MT part of an IAB node, where for example, the identifier may be of various temporary mobile subscriber identities (TMSI) or may be a globally unique temporary identity (GUTI) such as an MME-TMSI, a 5G-TMSI, a 4G-GUTI, or a 5G-GUTI; an identifier preconfigured in the IAB node #1, for example, an international mobile subscriber identity (IMSI), a subscription permanent identifier (SUPI), a subscription concealed identifier (SUCI), an international mobile equipment identity (IMEI), a fixed equipment identifier (PEI), or the like of an MT part; or a cell identifier (such as a PCI, an ECI, an NCI, an ECGI, or an NCGI) of a cell served by a parent node of the IAB node #1 for the IAB node #1 and an intra-cell identifier C-RNTI allocated by the parent node to the IAB node #1 in the cell.

In S802, the IAB node #1 sends the identification information #E1 of the IAB node #1 to the donor node.

For example, the MT part of the IAB node #1 sends an RRC message to the donor node, where the RRC message includes the identification information #E1 of the IAB node #1. Alternatively, the DU part of the IAB node #1 sends an F1AP message to the donor node, where the F1AP message includes the identification information #E1 of the IAB node #1.

In an optional embodiment, as shown in FIG. 8, if the donor node includes a donor CU part and a donor DU, the method provided in this embodiment of this application further includes the following step.

In S803, the CU sends configuration information #S1 to the donor DU, where the configuration information #S1 includes identification information #E1 of the IAB node #1 and an IP layer identifier of the IAB node #1.

Optionally, the configuration information #S1 further includes identification information #E2 of an IAB node #2, where the IAB node #2 is a child node of the donor DU, namely, a next-hop node of the donor DU from the donor DU to the IAB node #1.

Step S803 may be further specifically understood with reference to step S504, and details are not described again.

In an optional embodiment, as shown in FIG. 8, the method provided in this embodiment of this application further includes the following step.

In S804, the identification information #E1 is sent to the parent node of the IAB node #1.

In S804, there are two different cases separately described below.

Case 1: The donor node sends the identification information #E1 of the IAB node #1 to the parent node of the IAB node #1.

Case 2: The IAB node #1 sends the identification information #E1 of the IAB node #1 to the parent node of the IAB node #1.

Step S804 may be further specifically understood with reference to step S505, and details are not described again.

Embodiment 4

If a donor node includes a donor CU part and a donor DU part, FIG. 9 is a schematic flowchart of routing selection performed on a data packet according to an embodiment of this application.

In S901, a donor DU receives a data packet #D1, where the data packet #D1 includes an IP layer identifier of a target IAB node (for example, an IAB node #1).

In S902, identification information #E1 of the target IAB node #1 is added to the data packet #D1.

In S903, the donor DU determines a next-hop node (for example, an IAB node #2). Specifically, the donor DU may determine the next-hop node based on received configuration information #S1.

In this embodiment of this application, the configuration information #S1 includes the identification information #E1 of the IAB node #1, the IP layer identifier of the IAB node #1, and an identifier of the next-hop node.

In S904, a data packet #D1 to which the identification information #E1 is added is sent to the next-hop node of the donor DU.

Embodiment 5

FIG. 10 is a schematic diagram in which a CU-CP sends an IP layer identifier of an IAB node to a CU-UP.

In this embodiment of this application, a donor node includes a donor DU and a CU. The centralized unit CU includes a CU-CP and a CU-UP. The CU-CP may notify the CU-UP of an IP layer identifier of an IAB node #1.

By way of example and not limitation, routing may be performed between the CU-UP and the donor DU by using an IP layer, and the CU-CP may send the IP layer identifier of the IAB node #1 to the CU-UP by using an E1 interface. The E1 interface is an interface between the CU-CP and the CU-UP.

The CU-CP may allocate the IP layer identifier to the IAB node #1, or the CU-CP may obtain the IP layer identifier of the IAB node #1. A manner in which the CU-CP may obtain the IP layer identifier of the IAB node #1 may be: receiving the IP layer identifier of the IAB node #1 sent by a core network element, or receiving the IP layer identifier of the IAB node #1 sent by the IAB node #1.

In S1001, the CU-CP obtains the IP layer identifier of the IAB node #1.

The IP layer identifier in this embodiment of the present invention may be an IPv4 address or an IPv6 address.

For example, a manner in which the CU-CP obtains the IP layer identifier of the IAB node #1 may be: The CU-CP allocates the IP layer identifier to the IAB node #1.

Alternatively, the IAB node #1 obtains the IP layer identifier from a core network element (for example, an OAM, a PGW, or an SMF), and sends the IP layer identifier of the IAB node #1 to the CU-CP.

Alternatively, the core network element (for example, a mobility management function AMF network element) of the IAB node sends the IP layer identifier of the IAB node #1 to the CU-CP.

In S1002, the CU-CP sends the IP layer identifier of the IAB node #1 to the CU-UP.

In this embodiment of this application, after the CU-CP sends the IP layer identifier of the IAB node #1 to the CU-UP, the CU-UP may add the IP layer identifier of the IAB node #1 to a data packet that needs to be sent to the IAB node #1. This facilitates IP layer routing of the data packet between the CU-UP and the donor DU.

Embodiment 6

Figure 11:
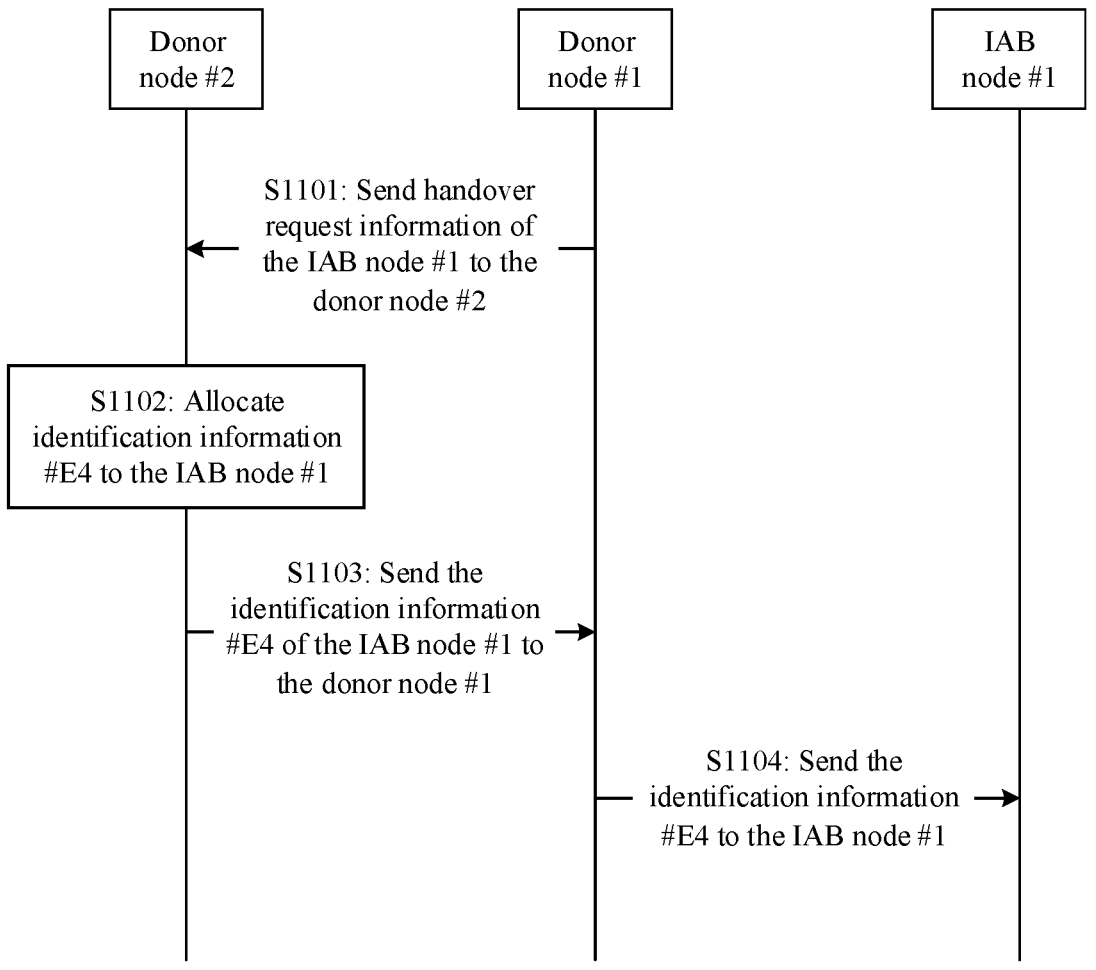
FIG. 11 is a schematic interaction diagram of still another identifier management method according to an embodiment of this application.

FIG. 11 is a schematic interaction diagram in which an IAB node is handed over between different donor nodes.

Referring to FIG. 11, when a topology structure of an IAB network is updated, that is, when an IAB node #1 is handed over from a source donor node to a target donor node, identification information used to perform routing on a wireless backhaul link needs to be changed.

In S1101, a donor node #1 sends handover request information of the IAB node #1 to a donor node #2.

Specifically, the source donor node #1 sends the handover request information of the IAB node #1 to the target donor node #2, where the handover request information is used to request to connect the IAB node #1 to the donor node #2.

In S1102, the donor node #2 allocates identification information #E4 to the IAB node #1.

Specifically, the target donor node #2 allocates the identification information #E4 to the IAB node #1, where the identification information #E4 is used to uniquely identify the IAB node #1 on a wireless backhaul link within a service range of the donor node #2.

In S1103, the target donor node #2 sends the identification information #E4 to the source donor node #1.

In S1104, the source donor node #1 sends the identification information #E4 to the IAB node #1.

For example, the source donor node #1 includes the identification information #E4 of the IAB node #1 in a handover command sent to the IAB node #1.

It should be understood that if a donor node includes a donor CU part and a donor DU part, the donor node in this embodiment of this application may be alternatively replaced with the CU for understanding. Optionally, if the CU includes a CU-CP and a CU-UP, the donor node in this embodiment of this application may be replaced with the CU-CP for understanding.

In this embodiment of this application, when the IAB node obtains in advance the identification information in the wireless backhaul link within a service range of the target donor node in a handover process between different donor nodes, a delay of the IAB node in the handover process between the donor nodes can be reduced.

Embodiment 7

Figure 12:
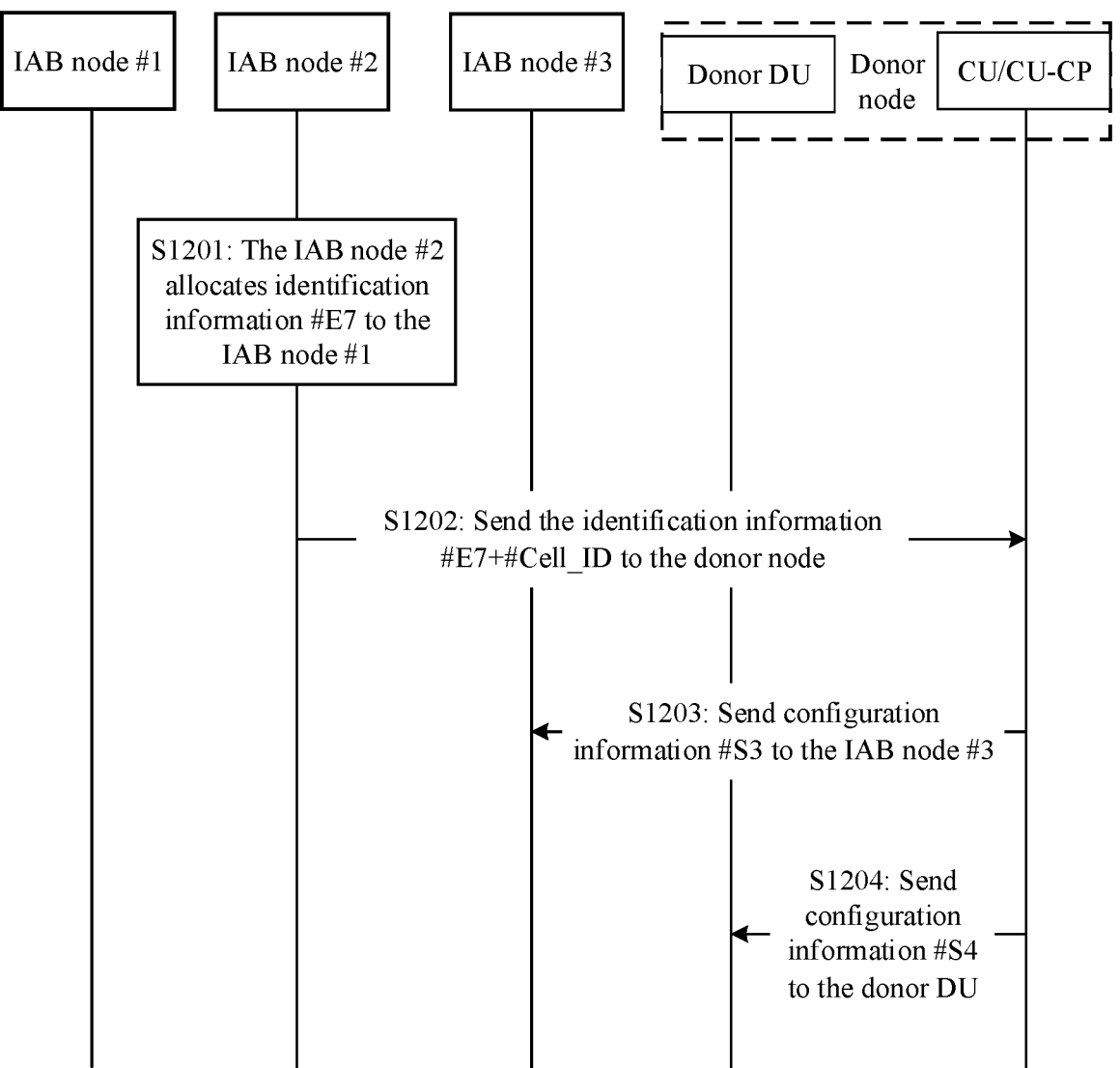
FIG. 12 is a schematic interaction diagram in which an IAB node is handed over between different CUs.

FIG. 12 is a schematic interaction diagram of still another identifier management method according to this application.

In S1201, a parent node (such as an IAB node #2 in FIG. 12) of an IAB node #1 allocates identification information #E7 to the IAB node #1. The identification information #E7 may be an intra-cell identifier (for example, a C-RNTI) allocated to the IAB node #1 in a cell of the parent node. The parent node of the IAB node #1 may send the allocated identification information #E7 to the IAB node #1.

In S1202, the IAB node #2 sends a message to a donor node, where the message includes the identification information #E7 of the IAB node #1 and a cell identifier #Cell_ID (such as an ECI, an NCI, an ECGI, and an NCGI) of a serving cell provided by the IAB node #2 for the IAB node #1. The Cell_ID uniquely identifies, within a range served by the donor node, the serving cell provided by the IAB node #2 for the IAB #node 1.

Optionally, the message sent by the IAB node #2 to the donor node further includes one or more of the following: an identifier #E5 (such as an IAB-DU F1AP UE ID allocated by the IAB node #2 to the IAB node #1), on an interface (such as an F1 interface between the IAB node #2 and the donor node) between the donor node and the IAB node #2, allocated by the IAB node #2 to the IAB node #1, or an identifier #E6 (such as an IAB donor CU F1AP UE ID allocated by the donor node to the IAB node #1), on an interface (such as the F1 interface between the IAB node #2 and the donor node) between the donor node and the IAB node #2, allocated by the donor node to the IAB node #1. The donor node may determine the IAB node #1 based on the identifier #E5 and/or the identifier #E6, and then may learn that the identification information #E7 and #Cell_ID carried in the received message are also used to identify the IAB node #1, and may be used to identify the IAB node #1 in wireless backhaul routing of a data packet and in a routing configuration of an IAB node or a donor DU.

Because #Cell_ID is unique within the range served by the donor node, and the identification information #E7 is unique within the range identified by #Cell_ID, the identification information #E7+#Cell_ID may be used to uniquely identify the IAB node #1 within the range served by the donor node.

In S1203, the donor node sends route configuration information #S3 to an intermediate IAB node (such as an IAB node #3 in FIG. 12) between the donor node and a target node, where the route configuration #S3 includes the following content: an identifier of the target node, and an identifier of a next-hop node.

The target node is a destination node to which a data packet needs to be routed on a wireless backhaul link, and the next-hop node is a next node on a path between the intermediate node and the target node. For example, the target node is the IAB node #1, and the next-hop node is the IAB node #2. An identifier of the target node is the identification information #E7 of the IAB node #1, and a cell identifier #Cell_ID of the IAB node #2. An identifier of the next-hop node is identification information (for example, an intra-cell identifier C-RNTI allocated to the IAB node #2 in a cell served by the IAB node #3, and a cell identifier (for example, a PCI, an ECI, an NCI, an ECGI, and an NCGI) of the cell served by the IAB node #3) of the IAB node #2.

Optionally, the configuration information #S3 sent by the donor node to the intermediate IAB node may be included in an F1AP message sent by the donor node to the intermediate IAB node, or may be included in an RRC message sent by the donor node to the intermediate IAB node.

According to the solution in this embodiment, the donor node sends a data packet to the IAB node #1 by using the IAB node #3 and the IAB node #2. The donor node may include the identification information #E7 and #Cell_ID of the IAB node #1 in the data packet, and send the data packet to the IAB node #3. The IAB node #3 may send forward the data packet to the IAB node #2 based on received routing configuration information, and then the IAB node #2 forwards the data packet to the IAB node #1. In this way, the data packet can be correctly forwarded between the donor node and the IAB nodes.

In an optional implementation, as shown in FIG. 12, if the donor node includes a donor CU part and a donor DU part, the method provided in this embodiment of this application further includes the following step.

In S1204, the CU sends configuration information #S4 to the donor DU, where the configuration information #S4 includes the identification information #E7 of the IAB node #1, the cell identifier #Cell_ID of the cell served by the parent node of the IAB node #1, and an IP layer identifier of the IAB node #1.

Optionally, the configuration information #S4 further includes identification information #E8 of the IAB node #3, where the IAB node #3 is a child node of the donor DU, namely, a next-hop node from the donor DU to the IAB node #1. The identification information #E8 of the IAB node #3 is, for example, an intra-cell identifier C-RNTI allocated to the IAB node #3 in a cell served by the donor DU and a cell identifier (such as a PCI, an ECI, an NCI, an ECGI, and an NCGI) of the cell served by the donor DU.

When the CU is in a form in which a control plane (CP) and a user plane (UP) are separated, the CU in step S1204 may be alternatively replaced with a CU-CP.

When the donor node is in a form in which the CU and the DU are separated, data needs to be forwarded between the CU and the IAB node #1 by using the donor DU. Therefore, the CU sends the configuration information #S4 to perform route configuration on the donor DU. Because data packet routing is performed between the CU and the donor DU by using an IP layer, the donor DU performs the data packet routing on a backhaul link by using an adaptation layer. The route configuration information sent by the CU to the donor DU includes the identification information #E7 of the IAB node #1, the cell identifier #Cell_ID of the cell served by the parent node of the IAB node #1, and the IP layer identifier of the IAB node #1. Therefore, the donor DU may maintain a correspondence between the identification information #E1, the cell identifier #Cell_ID, and the IP layer identifier of the IAB node #1. When receiving a downlink data packet

D1 whose IP layer destination address is the IP layer identifier of the IAB node #1, the donor DU adds, to the downlink data packet #D1, the identification information #E1 of the IAB node #1 and the cell identifier #Cell_ID of the cell served by the parent node of the IAB node #1, so that routing is performed when the downlink data packet #D1 is transmitted on the wireless backhaul link. The CU configures, for the donor DU, the identifier of the next-hop node of the IAB node #1, so that the donor DU can select the next-hop node for the data packet that is to be sent to the IAB node #1.

Optionally, the configuration information #S4 sent by the CU to the donor DU may be included in an F1AP message sent by the CU to the donor DU, and is transmitted by using a corresponding F1AP protocol layer between the CU and the donor DU.

Figure 13:
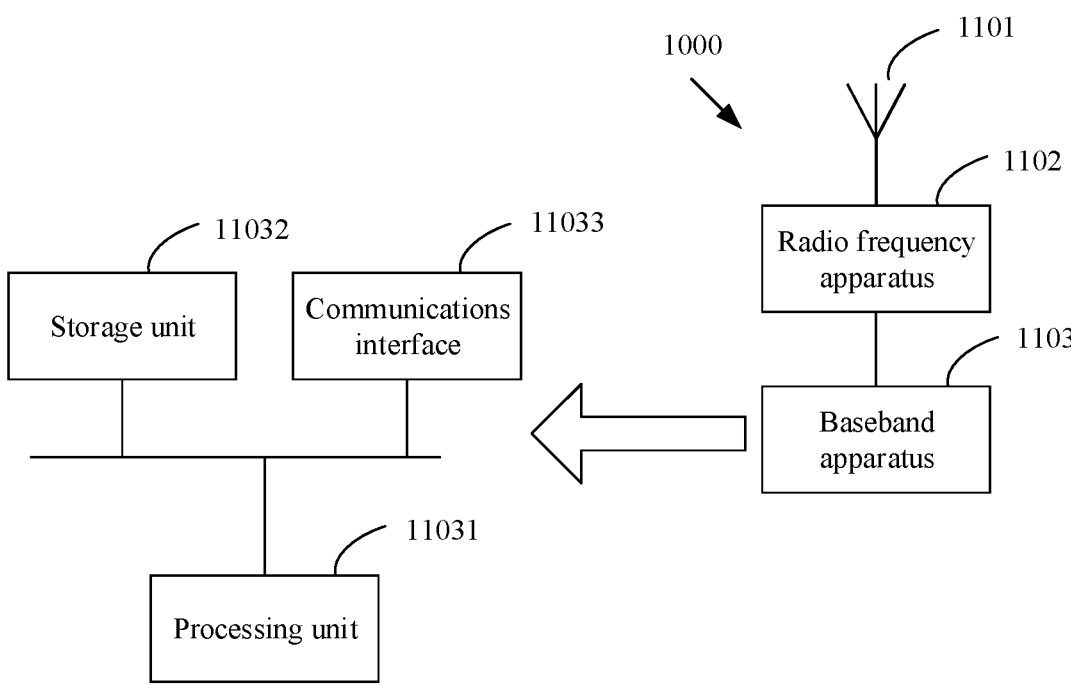
FIG. 13 is a schematic structural diagram of a communications apparatus according to an embodiment of this application.

FIG. 13 is a schematic structural diagram of a network device 1000 according to this application. The network device 1000 is configured to implement a function of a donor node in the method embodiments. As shown in FIG. 13, the network device 1000 includes an antenna 1101, a radio frequency apparatus 1102, and a baseband apparatus 1103. The antenna 1101 is connected to the radio frequency apparatus 1102. The baseband apparatus 1103 may include one or more processing units 11031. In addition, the baseband apparatus 1103 may further include a storage unit 11032 and a communications interface 11033. The storage unit 11032 is configured to store a program and data. The communications interface 11033 is configured to exchange information with the radio frequency apparatus 1102. The communications interface 11033 may be an input/output interface or an input/output circuit.

The network device 1000 in the apparatus embodiment of this application may correspond to the donor node in the method embodiments, and corresponding units included in the network device 1000 are configured to perform corresponding steps performed by the donor node #1 in the method embodiments.

For example, the radio frequency apparatus 1102 receives, by using the antenna 1101, indication information sent by the IAB node #1, where the indication information is used to indicate that the IAB node #1 can be configured to provide a wireless backhaul service. The radio frequency apparatus 1102 sends identification information to the IAB node #1 by using the antenna 1101, where the identification information includes identification information of the IAB node #1 and identification information of a donor gNB. The identification information is used to identify the IAB node #1 on a wireless backhaul link served by the donor gNB.

For another example, the radio frequency apparatus 1102 sends identification information #E1 to an IAB node #2 by using the antenna 1101, where the IAB node #2 is a parent node of the IAB node #1. That is, the IAB node #1 reports, to the parent node, the identification information #E1 allocated by the donor gNB to the IAB node #1.

For another example, the donor gNB includes a distributed unit DU and a centralized unit CU, and the distributed unit DU receives configuration information sent by the centralized unit CU. The configuration information includes an adaptation layer identifier of the IAB node #1, an IP layer identifier of the IAB node #1, and identification information of the IAB node #3. The IAB node #3 is a child node of the donor gNB.

For another example, the donor gNB includes a distributed unit DU and a centralized unit CU. The distributed unit DU receives a data packet #D1 sent by the centralized unit CU, where the data packet #D1 includes an IP layer identifier and data of the IAB node #1. The DU sends a data packet #D2 to the IAB node #1 based on configuration information #S1, where the data packet #D2 includes the IP layer identifier of the IAB node #1, the adaptation layer identifier of the IAB node #1, and the data.

For another example, a CU obtains an adaptation layer identifier #D1 of a donor DU, the CU sends the adaptation layer identifier #D1 to the donor DU, and the CU sends configuration information #S2 to the IAB node #1. The configuration information #S2 includes the adaptation layer identifier #D1 of the donor DU. Alternatively, the configuration information #S2 may further include an identifier of a next-hop node in uplink transmission from the IAB node #1 to the donor DU. Therefore, when sending uplink data to the donor node, the IAB node #1 may perform route selection based on the configuration information #S2.

For example, the CU may send the configuration information #S2 to the IAB node #1 by using an RRC message (for example, an RRC message sent to an MT part of the IAB node #1). Alternatively, the CU sends the configuration information #S2 to the IAB node #1 by using an F1AP message (for example, an F1AP message sent to a DU part of the IAB node #1).

For another example, the donor gNB includes a distributed unit DU and a centralized unit CU, the CU includes a control plane CU-CP and a user plane CU-UP, and the CU-CP is configured to: obtain an IP layer identifier of the IAB node #1, and send the IP layer identifier of the IAB node #1 to the CU-UP.

For another example, when the IAB node #1 is handed over from a donor gNB #1 to a donor gNB #2, the donor gNB #1 sends request information to the donor gNB #2. The request information is used to request the IAB node #1 to be handed over to the donor gNB #2. The donor gNB #1 receives identification information #E4 sent by the donor gNB #2. The donor gNB #1 sends the identification information #E4 to the donor gNB #2, where the identification information #E4 is used to identify the IAB node #1 on a wireless backhaul link served by the donor gNB #2.

An IAB node may obtain identification information on a wireless backhaul link within a service range of a donor node, and the identification information may be used as routing information of a data packet on the wireless backhaul link. Therefore, a routing problem of the data packet on the wireless backhaul link can be resolved.

In an implementation, the radio frequency apparatus 1102 receives, by using the antenna 1101, identification information #E7 allocated by the IAB node #2 to the IAB node #1 and a cell identifier #Cell_ID of a cell served by the IAB node #2. The identification information #E7 is used to identify the IAB node #1 in the cell served by the IAB node #2, and the IAB node #1 is a child node of the IAB node #2. The radio frequency apparatus 1102 sends configuration information #S3 to the IAB node #3 by using the antenna 1101. The configuration information #S3 includes the identification information #E7 of the IAB node #1, the cell identifier #Cell_ID of the cell served by the IAB node #2, and an identifier of a next-hop node of the IAB node #3. The IAB node #3 is an intermediate node between the donor node and the IAB node #1.

Optionally, an F1AP message or an RRC message sent by the radio frequency apparatus 1102 to the IAB node #3 by using the antenna 1101 includes the configuration information #S3.

The cell identifier #Cell_ID, for example, an ECI, an NCI, an ECGI, or an NCGI, of a serving cell provided by the IAB node #2 for the IAB node #1, is used to uniquely identify the serving cell provided by the IAB node #2 for the IAB node #1 within the serving range of the donor node.

Because #Cell_ID is unique within the range served by the donor node, and the identification information #E7 is unique within the range identified by #Cell_ID, the processing unit 11031 may uniquely identify the IAB node #1 within the range served by the donor node based on the identification information #E7+#Cell_ID.

In an implementation, the radio frequency apparatus 1102 receives first interface identification information or second interface identification information by using the antenna 1101, and the processing unit 11031 determines the IAB node #1 based on the first interface identification information and/or the second interface identification information. The first interface identification information is identification information that is allocated by the IAB node #2 to the IAB node #1 and that is on an interface between the donor node and the IAB node #2. The second interface identification information is identification information that is allocated by the donor node to the IAB node #1 and that is on the interface between the donor node and the IAB node #2.

For example, the first interface identification information may be an identifier #E5 (for example, an IAB-DU F1AP UE ID allocated by the IAB node #2 to the IAB node #1) that is on the interface (for example, an F1 interface between the IAB node #2 and the donor node) between the donor node and the IAB node #2 and that is allocated by the IAB node #2 to the IAB node #1.

For example, the second interface identification information may be an identifier #E6 (for example, an IAB donor CU F1AP UE ID allocated by the donor node to IAB node #1) that is on an interface (for example, the F1 interface between the IAB node #2 and the donor node) between the donor node and the IAB node #2 and that is allocated by the donor node to the IAB node #1.

Therefore, the donor node may determine the IAB node #1 based on the identifier #E5 and/or the identifier #E6, and then may learn that the identification information #E7 and #Cell_ID that are of the IAB node #1 and that are carried in the received message are also used to identify the IAB node #1, and may be used to identify the IAB node #1 in wireless backhaul routing of a data packet and in a routing configuration of an IAB node or a donor DU.

In an implementation, the donor gNB includes a distributed unit DU and a centralized unit CU, and the DU receives configuration information #S4 sent by the CU. The configuration information #S4 includes the identification information #E7 of the IAB node #1, the identifier #Cell_ID of the cell served by the IAB node #2, and the IP layer identifier of the IAB node #1.

In an implementation, units of the donor gNB for implementing the steps in the foregoing methods may be implemented in a form of scheduling a program by using a processing unit. For example, the processing unit 11031 invokes the program stored in the storage unit 11032, to perform the method performed by the donor gNB in the foregoing method embodiments. The storage unit 11032 may be an on-chip storage unit located on a same chip as the processing unit 11031, or may be a storage element, namely, an off-chip storage unit, located on a different chip from the processing unit 11031.

Figure 14:
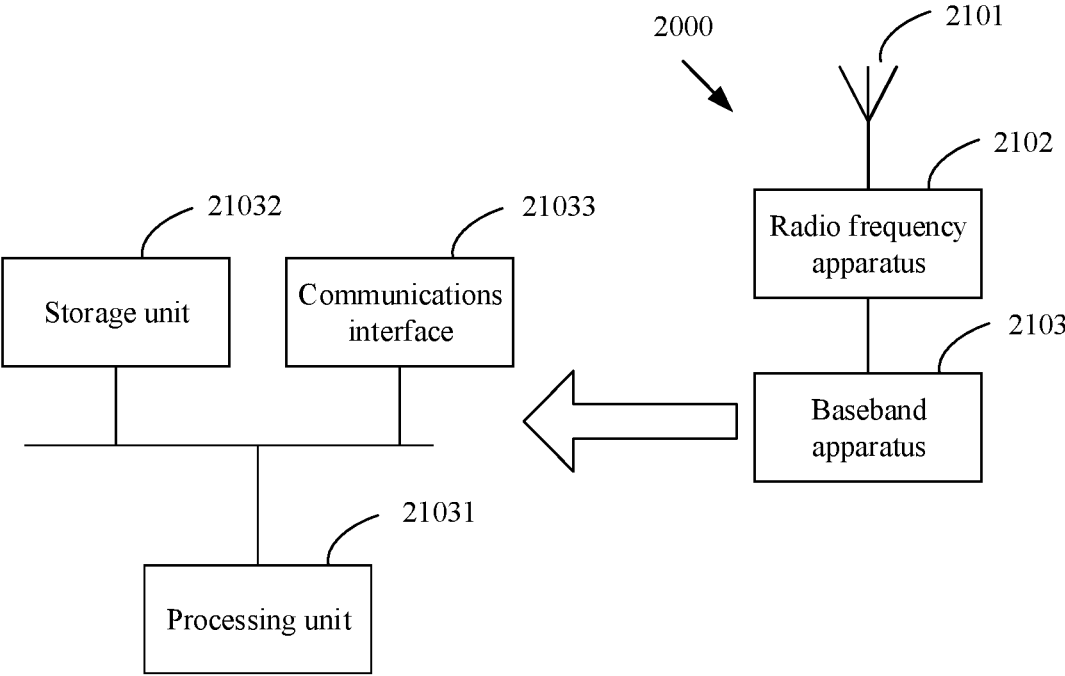
FIG. 14 is a schematic structural diagram of another communications apparatus according to an embodiment of this application.

FIG. 14 is a schematic structural diagram of a network device 2000 according to this application. The network device 2000 is configured to implement a function of the IAB node #1 in the method embodiments. As shown in FIG. 14, the network device 2000 includes an antenna 2101, a radio frequency apparatus 2102, and a baseband apparatus

2103. The antenna 2101 is connected to the radio frequency apparatus 2102. The baseband apparatus 2103 may include one or more processing units 21031. In addition, the baseband apparatus 2103 may further include a storage unit 21032 and a communications interface 21033. The storage unit 21032 is configured to store a program and data. The communications interface 21033 is configured to exchange information with the radio frequency apparatus 2102. The communications interface 21033 may be an input/output interface or an input/output circuit.

The network device 2000 in the apparatus embodiment of this application may correspond to the IAB node #1 in the method embodiments, and corresponding units included in the network device 2000 are configured to perform corresponding steps performed by the IAB node #1 in the method embodiments.

For example, in a startup process, the IAB node #1 accesses a network as an MT by using a parent node. After accessing the network or in a process of accessing the network, the IAB node #1 may send indication information #1 to a donor node, indicating that the IAB node #1 is an IAB node and can be used to provide wireless access and wireless backhaul services.

For example, the radio frequency apparatus 2102 sends indication information to a donor gNB by using the antenna 2101. The indication information may be used to indicate that the IAB node #1 can be configured to provide a wireless backhaul service. The radio frequency apparatus 2102 receives, by using the antenna 2101, identification information sent by the donor gNB, where the identification information includes identification information of the IAB node #1 and identification information of the donor gNB. The identification information is used to identify the IAB node #1 on a wireless backhaul link served by the donor gNB.

For another example, the radio frequency apparatus 2102 sends identification information #E1 to an IAB node #2 by using the antenna 2101, where the IAB node #2 is the parent node of the IAB node #1. That is, the IAB node #1 reports, to the parent node, the identification information #E1 allocated by the donor gNB to the IAB node #1.

For another example, when the IAB node #1 is handed over from a donor gNB #1 to a donor gNB #2, the IAB node #1 receives identification information #E4 sent by the donor gNB #1. The identification information #E4 is used to identify the IAB node #1 on a wireless backhaul link served by the donor gNB #2.

For another example, the processing unit 21031 obtains the identification information #E1 of the IAB node #1, and the radio frequency apparatus 2102 sends the identification information #E1 of the IAB node #1 to the donor gNB #1 by using the antenna 2101.

The apparatus 2000 in the foregoing apparatus embodiment may be a chip on the baseband apparatus 2103, and the chip includes at least one processing unit and an interface circuit. The processing element is configured to perform steps of any method performed by the IAB node #1, and the interface circuit is configured to communicate with another apparatus.

In an implementation, units of the IAB node #1 for implementing the steps in the foregoing methods may be implemented in a form of scheduling a program by using a processing unit. For example, the processing unit 21031 invokes the program stored in the storage unit 21032, to perform the method performed by the IAB node #1 in the foregoing method embodiments. The storage unit 21032 may be an on-chip storage unit located on a same chip as the processing unit 21031, or may be a storage element, namely, an off-chip storage unit, located on a different chip from the processing unit 21031.

In addition, this application provides a computer-readable storage medium. The computer-readable storage medium stores computer instructions. When the computer instructions are run on a computer, the computer is enabled to perform a corresponding operation and/or procedure performed by an IAB node or a donor node in any method embodiment.

This application further provides a computer program product. The computer program product includes computer program code, and when the computer program code is run on a computer, the computer performs the identifier management method in the embodiments of this application or a corresponding operation and/or procedure performed by an IAB node or a donor node in any method embodiment.

This application further provides a chip, including a processor. The processor is configured to invoke and run a computer program stored in a memory, to perform a corresponding operation and/or procedure performed by an IAB node or a donor node in the identifier management method in the embodiments of this application.

Optionally, the chip further includes the memory, and the memory is connected to the processor. The processor is configured to read and execute the computer program that is in the memory.

Further, optionally, the chip further includes a communications interface, and the processor is connected to the communications interface. The communications interface is configured to receive a signal and/or data that need/needs to be processed. The processor obtains the signal and/or data from the communications interface, and processes the signal and/or data.

Optionally, the communications interface may be an input/output interface, and may specifically include an input interface and an output interface. Alternatively, the communications interface may be an input/output circuit, and may specifically include an input circuit and an output circuit.

The memory and the memory in the foregoing embodiments may be physically independent units, or the memory may be integrated with the processor.

In the foregoing embodiments, the processor may be a central processing unit (CPU), a microprocessor, an application-specific integrated circuit (ASIC), one or more integrated circuits for controlling program execution in the technical solutions of this application, or the like. For example, the processor may be a digital signal processor device, a microprocessor device, an analog-to-digital converter, a digital-to-analog converter, or the like. The processor may allocate control and signal processing functions of a terminal device or a network device to the devices based on respective functions of the devices. In addition, the processor may have a function of operating one or more software programs, and the software program may be stored in a memory. The function of the processor may be implemented by hardware, or may be implemented by hardware by executing corresponding software. The hardware or software includes one or more modules corresponding to the foregoing function.

The memory may be a read-only memory (ROM), another type of static storage device that can store static information and instructions, a random access memory (RAM) or another type of dynamic storage device that can store information and instructions, or may be an electrically erasable programmable read-only memory (EEPROM), a compact disc read-only memory (CD-ROM) or another optical disc storage, an optical disc storage (including a compact optical disc, a laser disc, an optical disc, a digital versatile optical disc, a Blu-ray disc, and the like), a magnetic disk storage medium or another magnetic storage device, or any other medium that can be used to carry or store expected program code in a form of an instruction or a data structure and that can be accessed by a computer.

In the embodiments of this application, "and/or" describes an association relationship between associated objects and represents that there may be three relationships. For example, A and/or B may represent the following three cases: Only A exists, both A and B exist, and only B exists. A and B may be singular or plural.

A person of ordinary skill in the art may be aware that, in combination with the examples described in the embodiments disclosed in this specification, units can be implemented by electronic hardware or a combination of electronic hardware and computer software. Whether the functions are performed by using hardware or software depends on particular applications and design constraints of the technical solutions. A person skilled in the art may use different methods to implement the described functions for each particular application.

In the several embodiments provided in this application, it should be understood that the disclosed system, apparatuses, and methods may be implemented in other manners. For example, the described apparatus embodiments are merely examples. For example, division into the units is merely logical function division. There may be another division manner in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or another form.

The units described as separate parts may or may not be physically separate, and parts displayed as units may or may not be physical units, to be specific, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to a conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions describe merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An identifier management method, comprising:
   receiving, by a first donor node, first indication information sent by a first node to the first donor node, wherein the first indication information indicates to the first donor node that the first node is an integrated access and backhaul (IAB) node;
   in response to receiving the first indication information, obtaining, by the first donor node, a first identifier, wherein the first identifier includes an IP address of the first node that is allocated by an OAM to the first node;
   sending, by the first donor node, handover request information to a second donor node, wherein the handover request information requests to connect the first node to the second donor node;
   receiving, by the first donor node from the second donor node, identification information of the first node allocated by the second donor node, wherein the identification information of the first node is an adaptation layer identifier; and
   in response to receiving the identification information of the first node from the second donor node, sending, by the first donor node to the first node, a handover command, wherein the handover command carries the identification information of the first node;
   wherein the first donor node comprises a distributed unit (DU) and a centralized unit (CU), and wherein the method further comprises:
      receiving, by the DU, first configuration information sent by the CU, wherein the first configuration information comprises a first adaptation layer identifier of the first node and the IP address of the first node;
      receiving, by the DU, a first data packet sent by the CU, wherein the first data packet comprises the IP address of the first node and data; and
      sending, by the DU to the first node, a second data packet, wherein the second data packet comprises the IP address of the first node and the data.

2. The method according to claim 1, wherein the method further comprises:
   allocating, by the first donor node to the first node, the first adaptation layer identifier of the first node;
   sending, by the first donor node to the first node, the first adaptation layer identifier of the first node; and
   sending, by the first donor node to a second node, the first adaptation layer identifier of the first node, wherein the second node is a parent node of the first node.

3. The method according to claim 2, wherein sending, by the first donor node to the first node, the first adaptation layer identifier of the first node comprises:
   sending, by the first donor node to the first node, an F1 application protocol (F1AP) message comprising the first adaptation layer identifier of the first node.

4. The method according to claim 1, wherein the method further comprises:
   receiving, by the DU from the CU, an adaptation layer identifier which is allocated by the CU to the DU.

5. The method according to claim 1, wherein the method further comprises:

receiving, by the DU, a third data packet which comprises an IP layer identifier of a target wireless backhaul node; and adding, by the DU, an adaptation layer identifier of the target wireless backhaul node into the third data packet.

6. The method according to claim 1, wherein the first indication information further indicates the first donor node to allocate a first adaptation layer identifier to the first node.

7. The method according to claim 1, wherein the first indication information further indicates the first donor node to allocate the first identifier to the first node, and the first identifier further includes an identifier of the first donor node.

8. A first donor node, comprising at least one processor and at least memory storing instructions, wherein the instructions are executed by the at least one processor to cause the first donor node to perform a method of:

receiving first indication information sent by a first node to the first donor node, wherein the first indication information indicates to the first donor node that the first node is an integrated access and backhaul (IAB) node;

in response to receiving the first indication information, obtaining a first identifier, wherein the first identifier includes an IP address of the first node that is allocated by an OAM to the first node;

sending handover request information to a second donor node, wherein the handover request information requests to connect the first node to the second donor node;

receiving, from the second donor node, identification information of the first node allocated by the second donor node, wherein the identification information of the first node is an adaptation layer identifier; and in response to receiving the identification information of the first node from the second donor node, sending, to the first node, a handover command, wherein the handover command carries the identification information of the first node;

wherein the first donor node comprises a distributed unit (DU) and a centralized unit (CU), and wherein the DU is configured to:

receive first configuration information sent by the CU, wherein the first configuration information comprises a first adaptation layer identifier of the first node and the IP address of the first node;

receive a first data packet sent by the CU, wherein the first data packet comprises the IP address of the first node and data; and send a second data packet to the first node, wherein the second data packet comprises the IP address of the first node and the data.

9. The node according to claim 8, wherein the method further comprises:

allocating, to the first node, the first adaptation layer identifier of the first node;

sending, to the first node, the first adaptation layer identifier of the first node; and sending, to a second node, the first adaptation layer identifier of the first node, wherein the second node is a parent node of the first node.

10. The node according to claim 9, wherein sending, to the first node, the first adaptation layer identifier of the first node comprises:

sending, to the first node, an F1 application protocol (F1AP) message comprising the first adaptation layer identifier of the first node.

11. The node according to claim 8, wherein the DU is configured to receive, from the CU, an adaptation layer identifier which is allocated by the CU to the DU.

12. The node according to claim 8, wherein the DU is configured to:

receive a third data packet comprising an IP layer identifier of a target wireless backhaul node; and add an adaptation layer identifier of the target wireless backhaul node into the third data packet.

* * * * *